May 16, 1967  A. E. TOMMARELLO  3,319,451
DRAWING APPARATUS FOR TUBES OR THE LIKE
Filed July 22, 1964  16 Sheets-Sheet 8
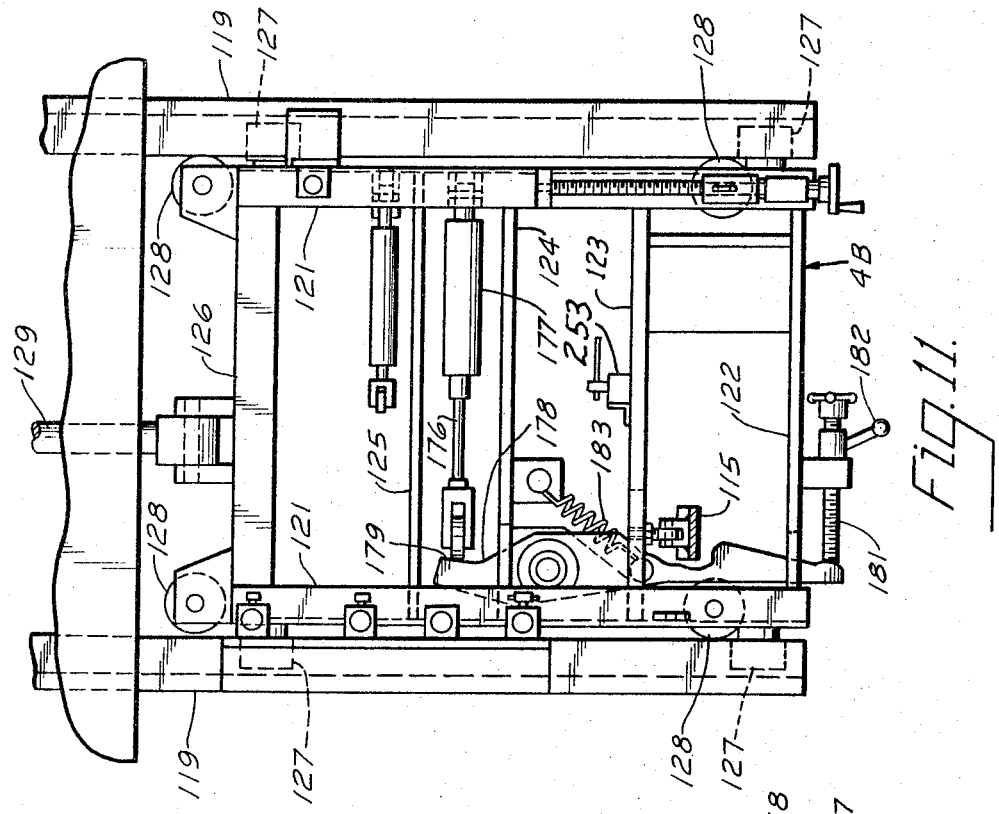
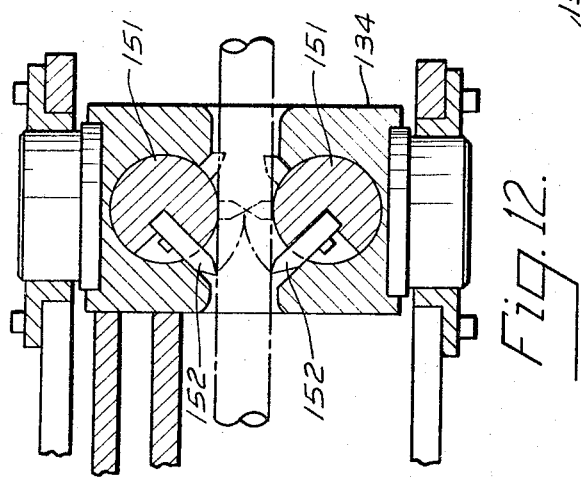
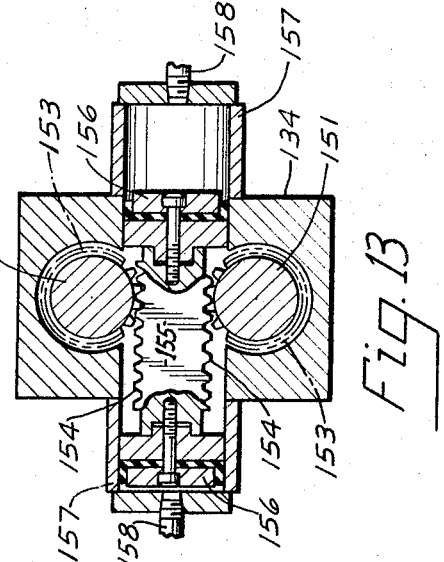
INVENTOR.
ALBERT E. TOMMARELLO
BY Bosworth, Sessions,
Herrstrom & Knowles
ATTORNEYS.

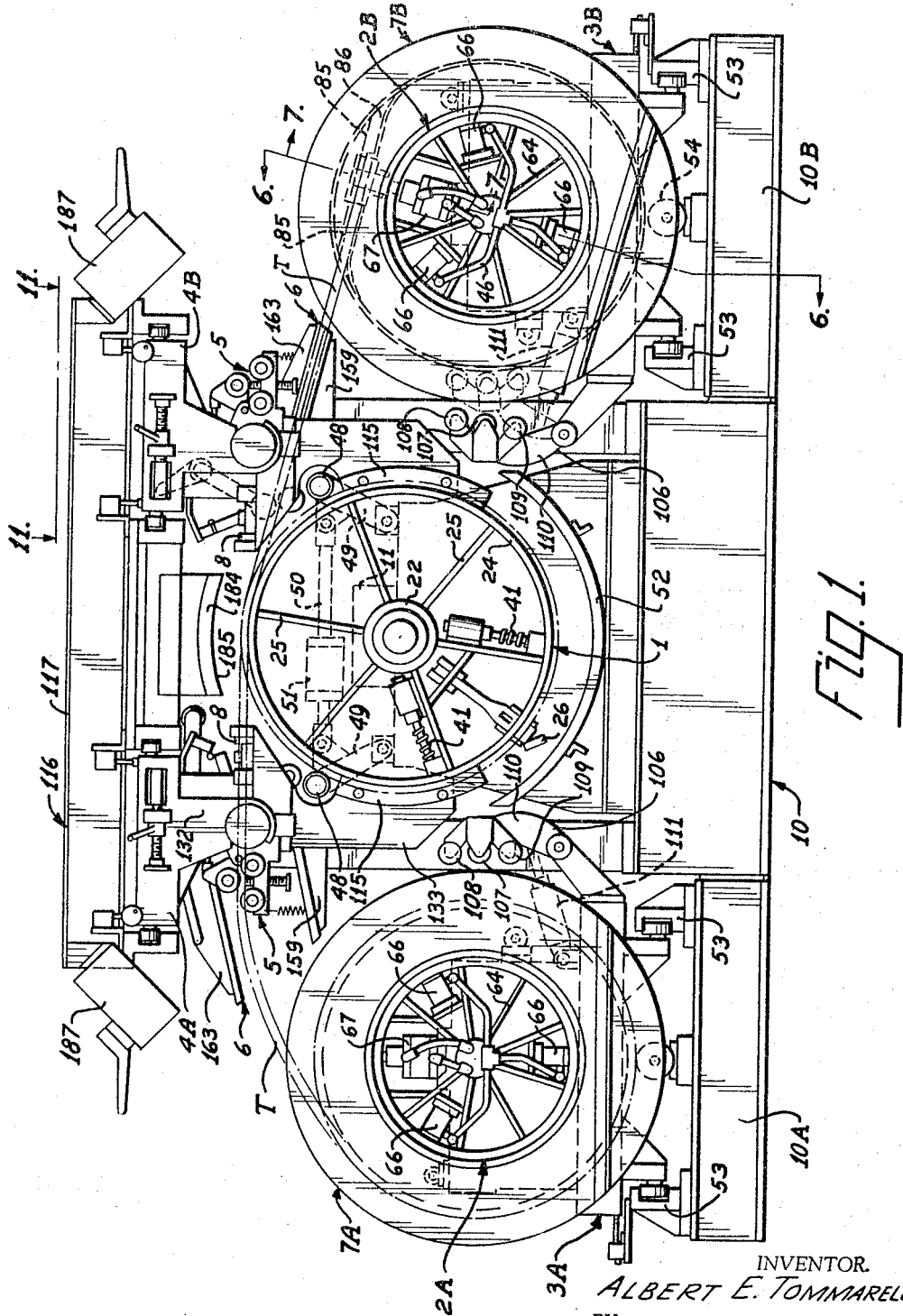

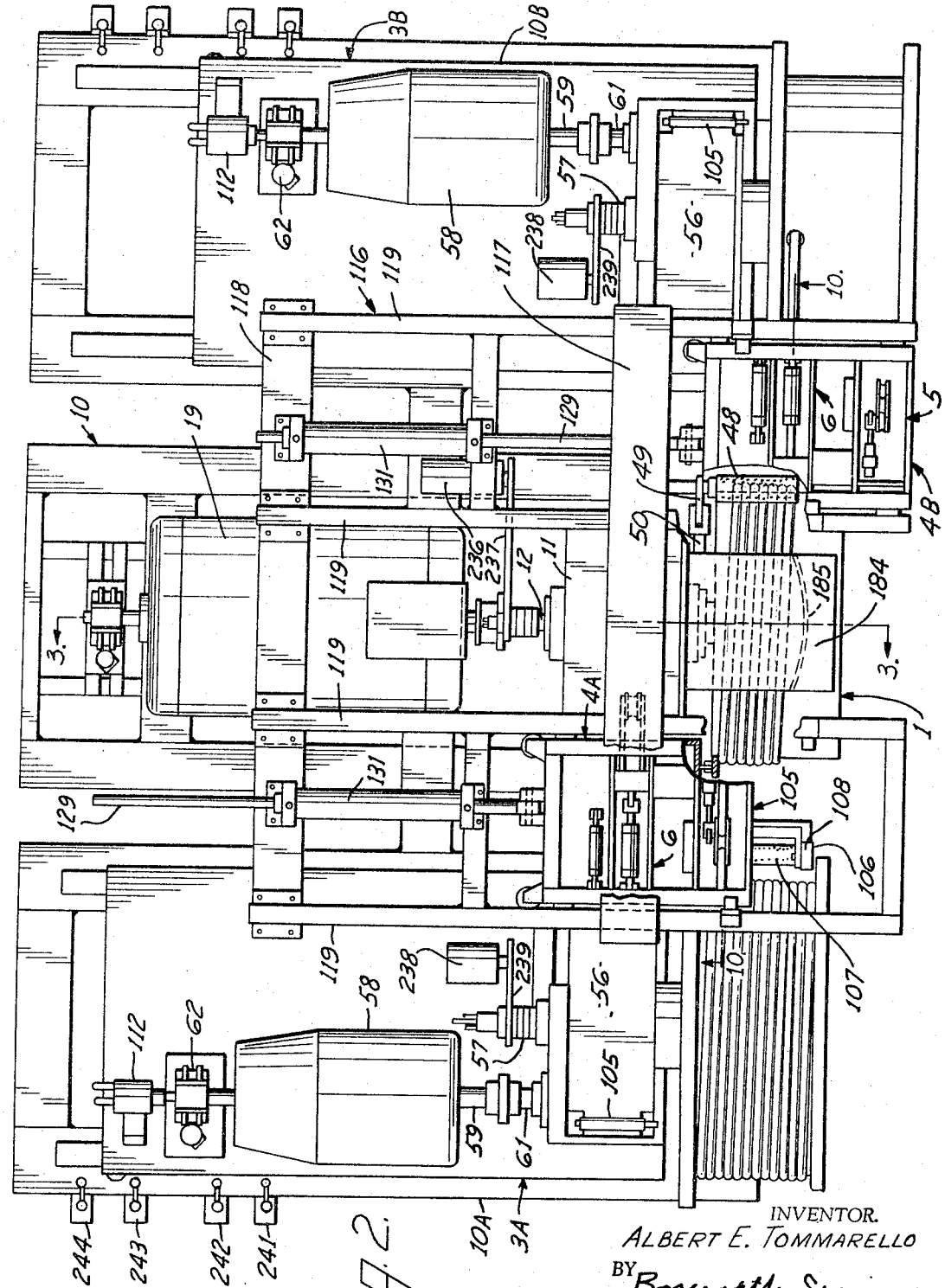

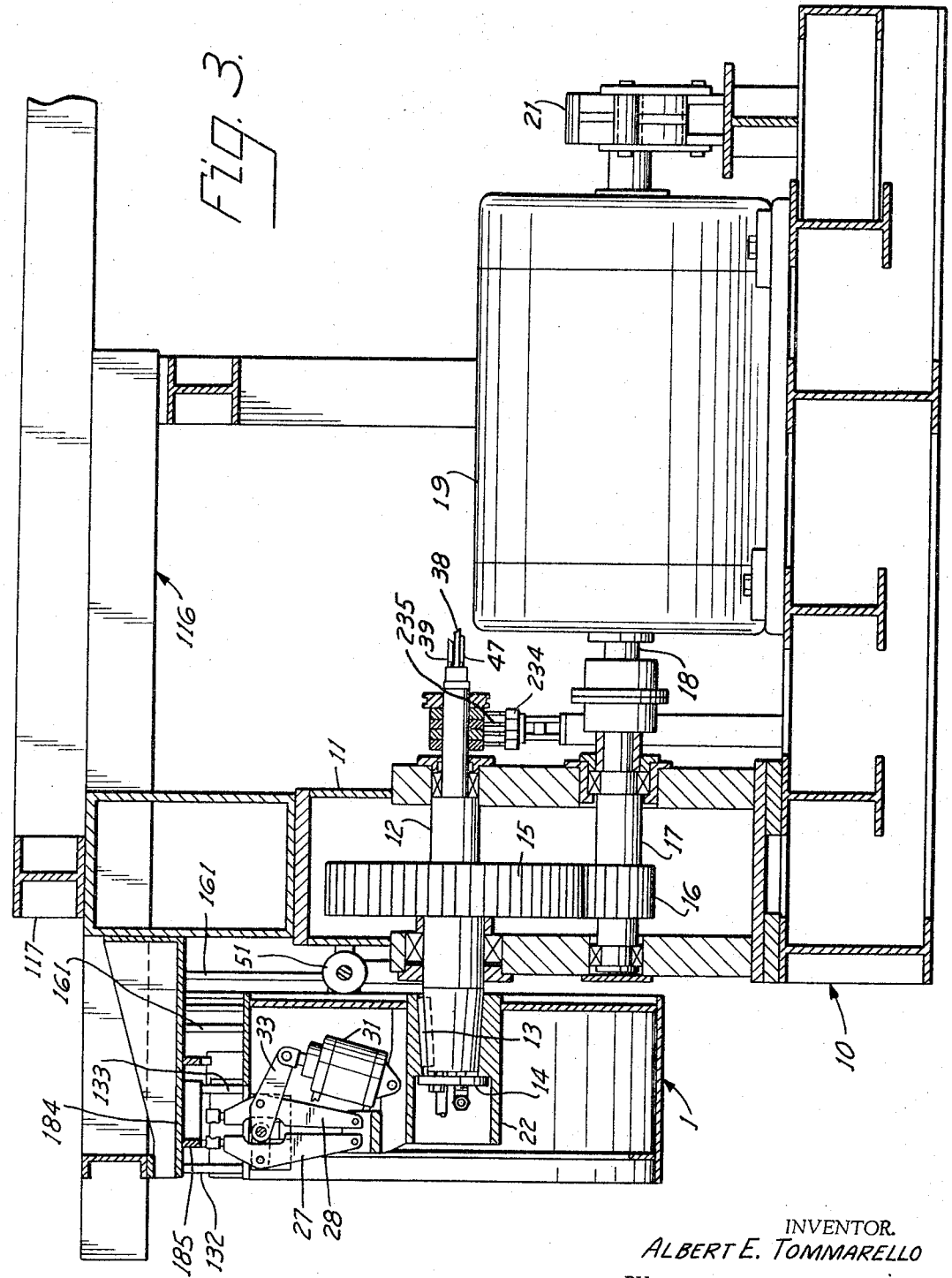

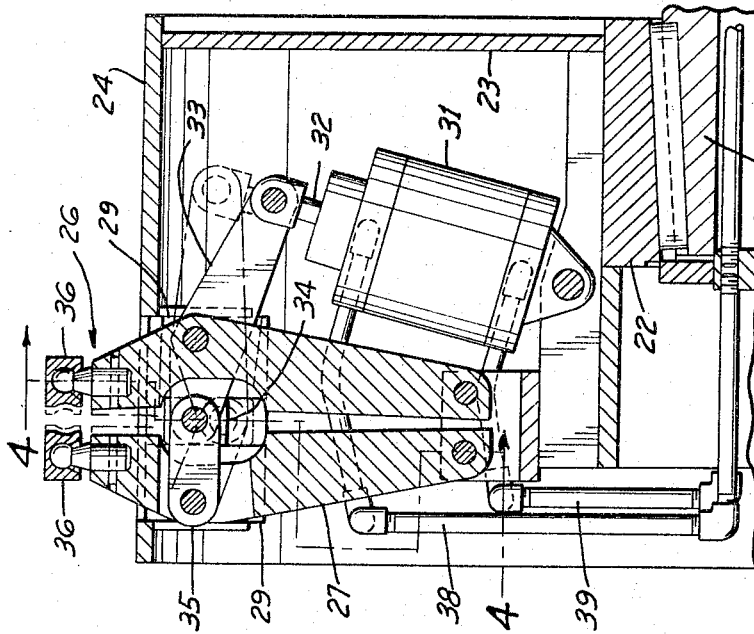
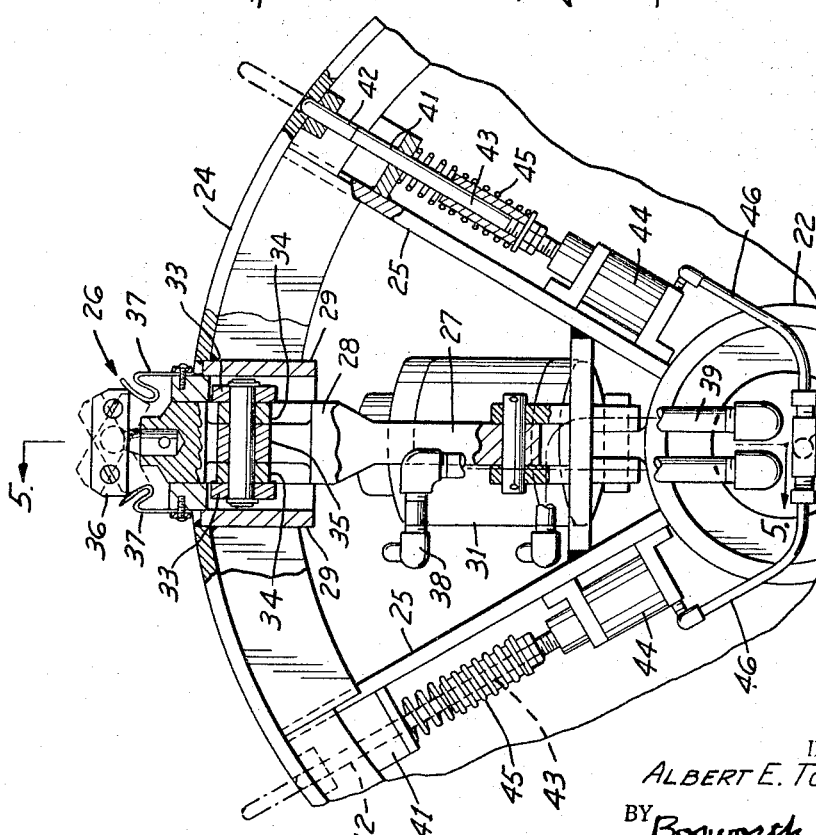

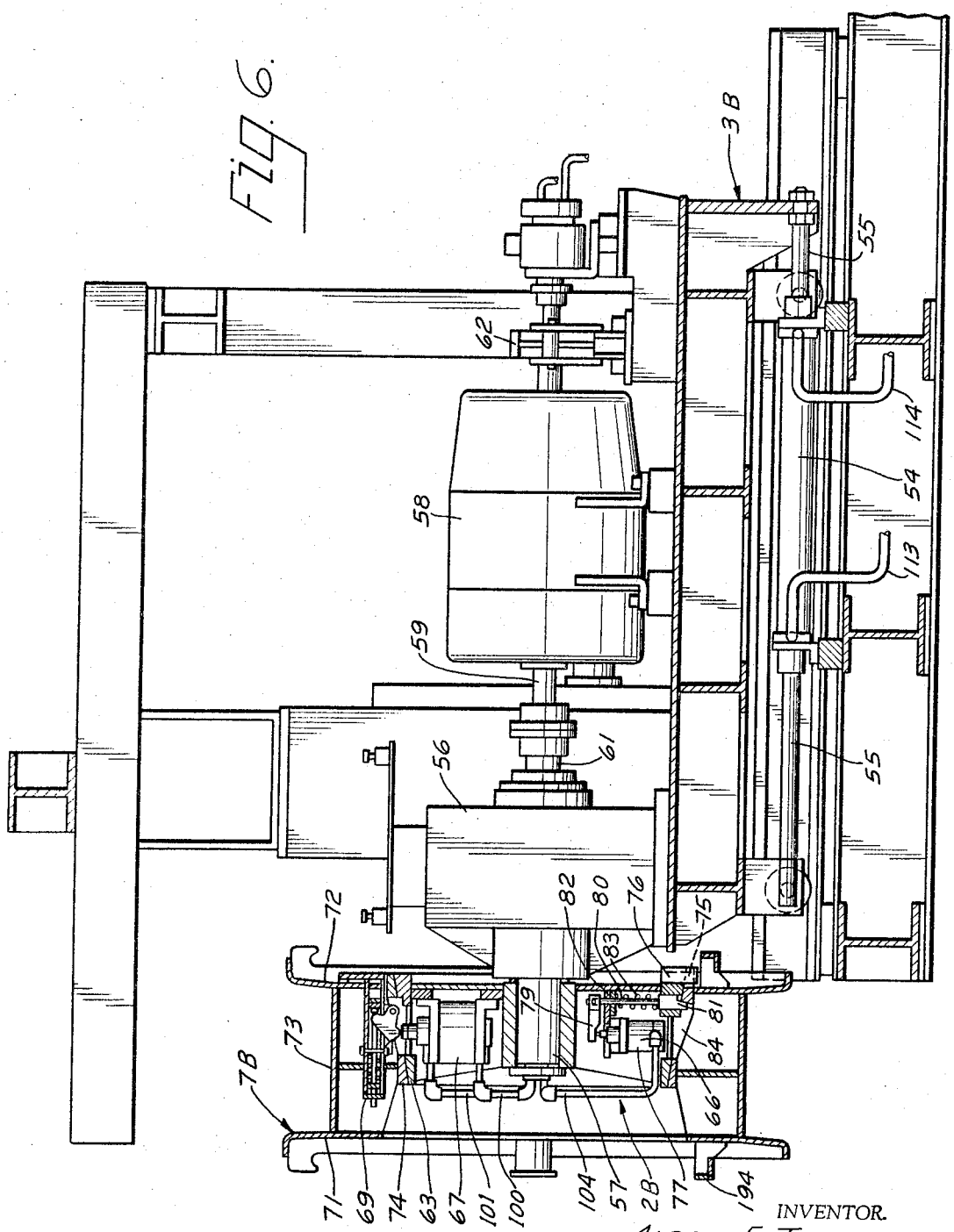

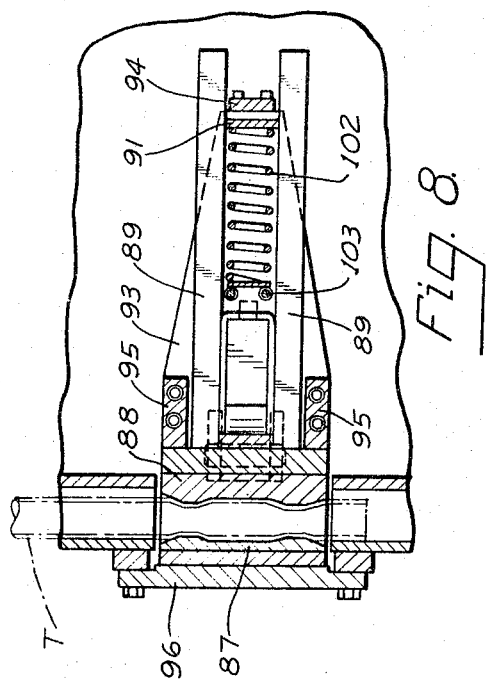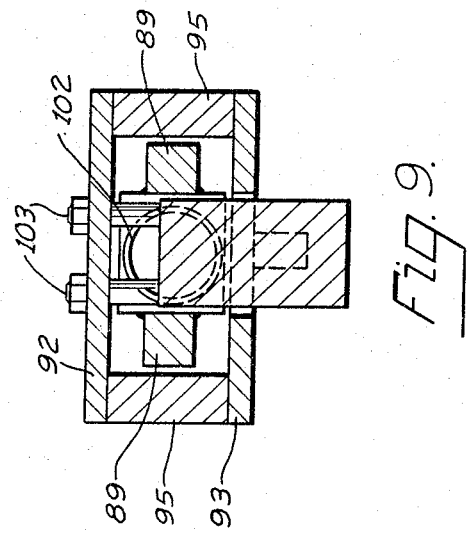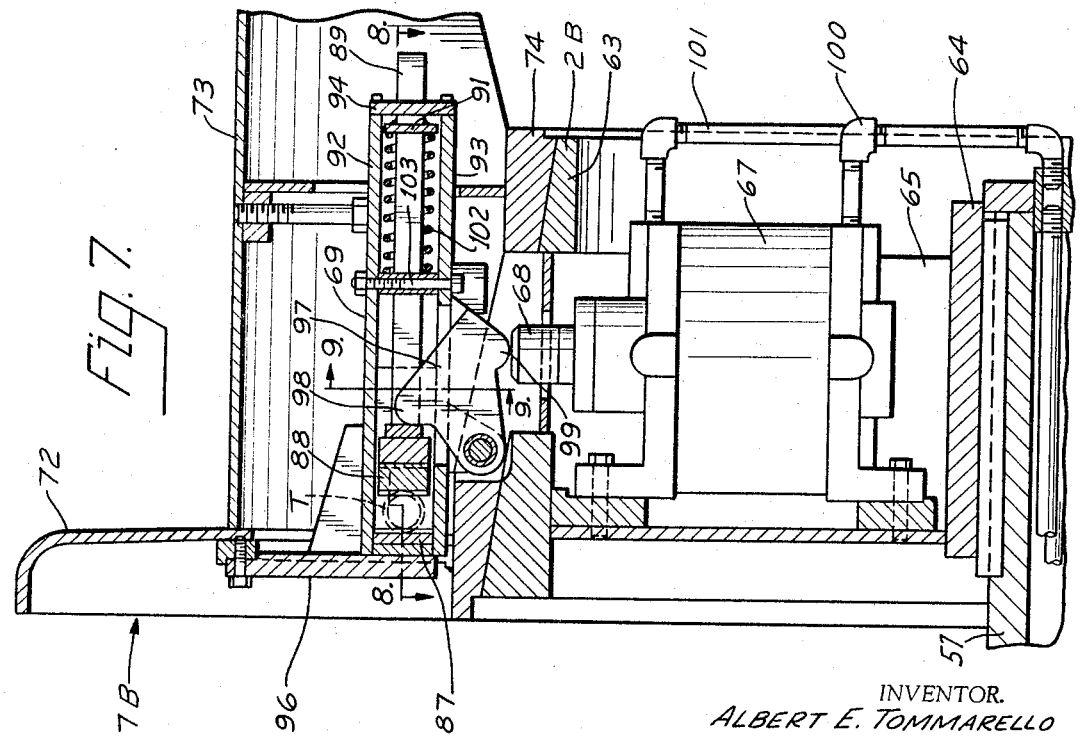

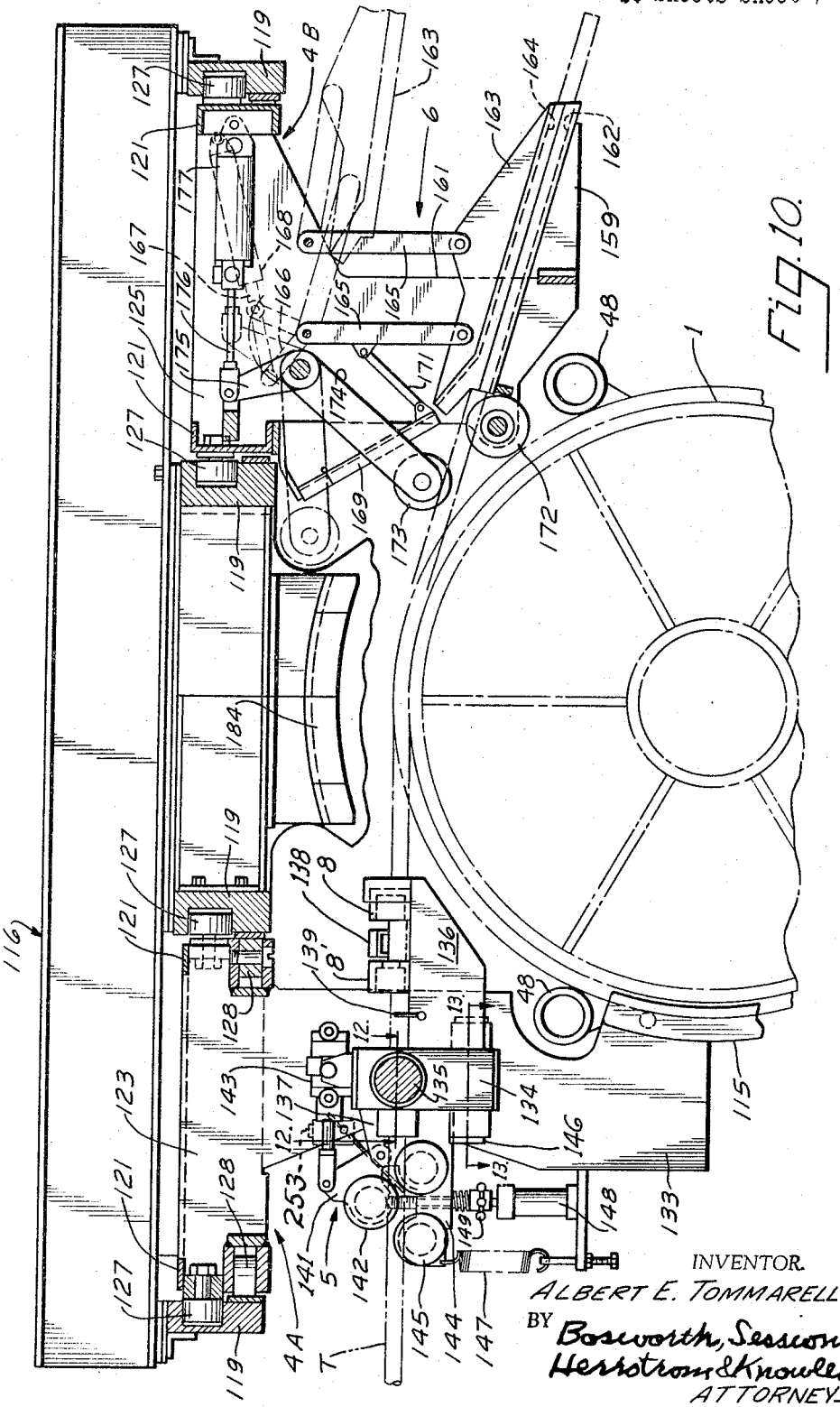

May 16, 1967 A. E. TOMMARELLO 3,319,451
DRAWING APPARATUS FOR TUBES OR THE LIKE
Filed July 22, 1964 16 Sheets-Sheet 9
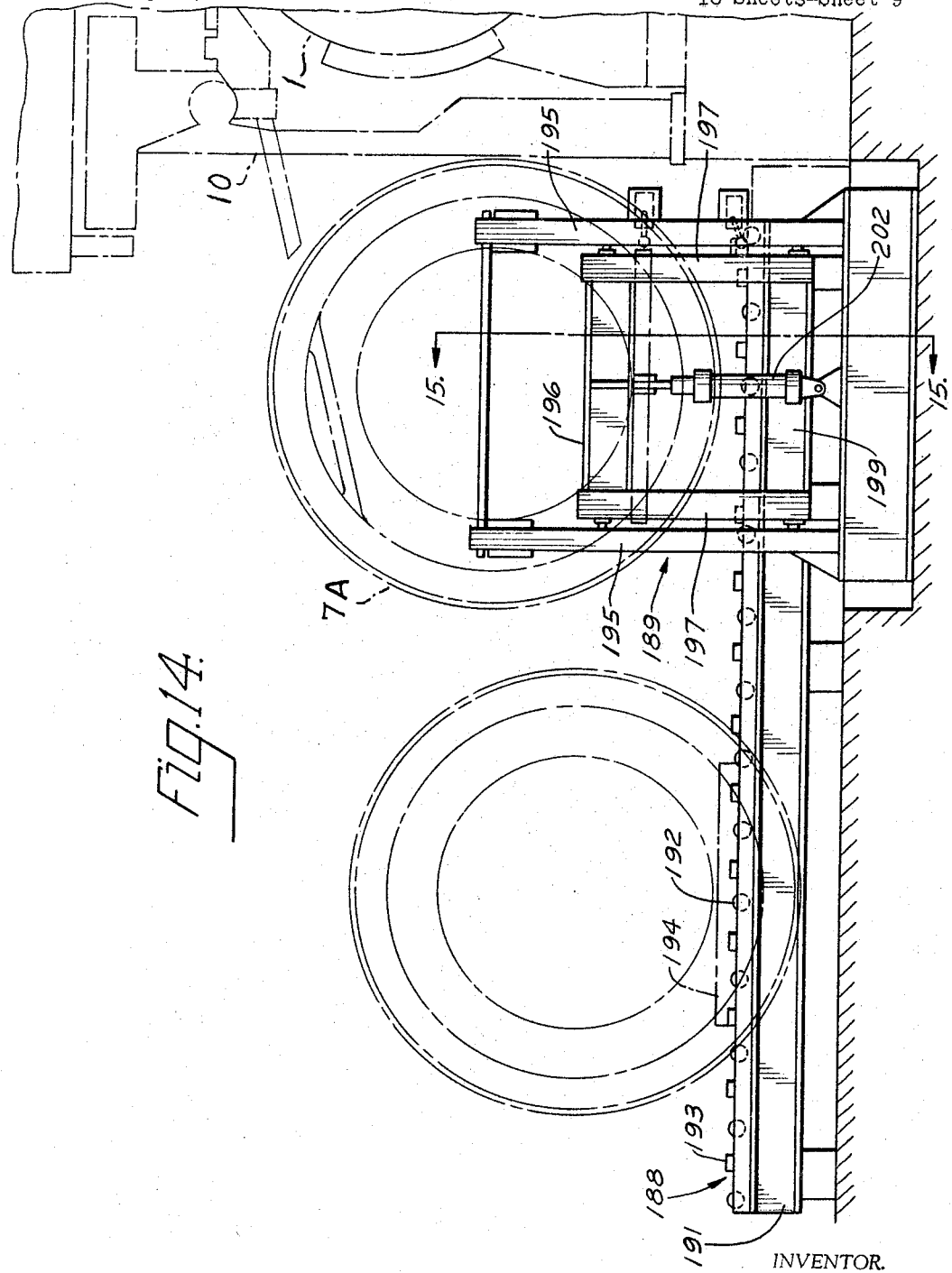
INVENTOR.
ALBERT E. TOMMARELLO
BY Bosworth, Sessions,
Herstrom & Knowles
ATTORNEYS.

May 16, 1967 A. E. TOMMARELLO 3,319,451
DRAWING APPARATUS FOR TUBES OR THE LIKE
Filed July 22, 1964 16 Sheets-Sheet 10

INVENTOR.
ALBERT E. TOMMARELLO
BY Bosworth, Sessions
Herrstrom & Knowles
ATTORNEYS.

INVENTOR.
ALBERT E. TOMMARELLO
BY Bosworth, Sessions,
Herrstrom & Knowles
ATTORNEYS.

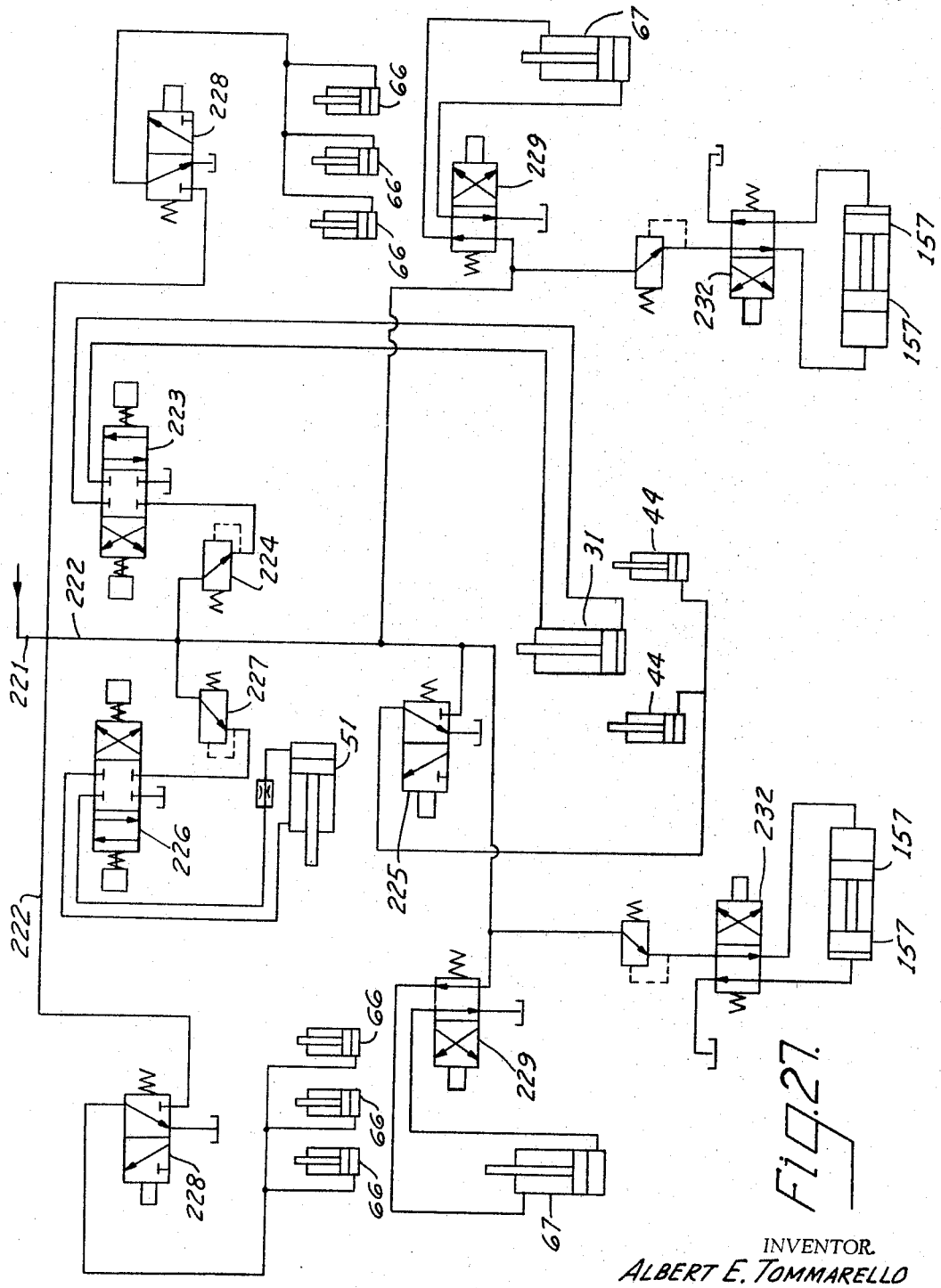

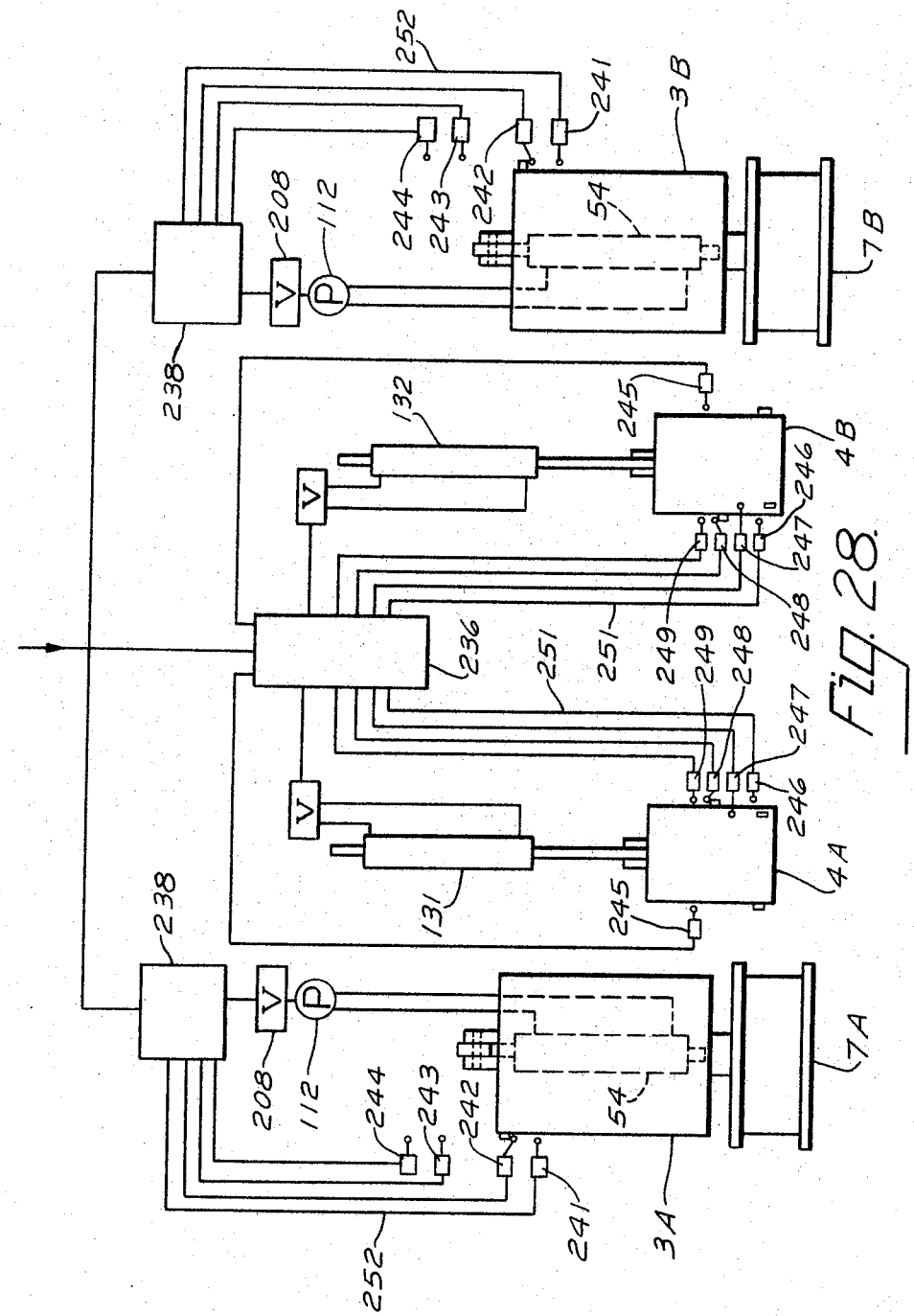

United States Patent Office 3,319,451
Patented May 16, 1967

3,319,451
DRAWING APPARATUS FOR TUBES OR THE LIKE
Albert E. Tommarello, Pittsburgh, Pa., assignor to Blaw-Knox Company, Pittsburgh, Pa., a corporation of Delaware
Filed July 22, 1964, Ser. No. 384,502
19 Claims. (Cl. 72—274)

This invention relates to the drawing of metal strands, and more particularly to the repetitive drawing in opposite directions of such strands. The invention is described herein as applied to the drawing of tubing to reduce long lengths of large diameter tubing to longer lengths of small diameter tubing, but the invention may be applied to other purposes and uses.

Usually, lengths of large diameter tubing are thus drawn either on a series of draw benches, which require a great deal of space and can only produce tubing in limited lengths, or on machines known as "bull blocks" in which a coil of tubing is drawn from a pay-off tray through a die by a drawing drum to reduce the tubing diameter and increase the tubing length. The coil of drawn tubing is then transferred by coil handling facilities from the drum to the pay-off tray of the same or another bull block to further reduce the diameter and increase the length of the tubing. Similar operations are carried out successively until tubing of the desired size has been produced. In an operation of this sort, much time is consumed in handling the coils of tubing, threading the tubing through the dies and like operations. Moreover, a series of bull blocks and associated coil handling facilities constitute a large and expensive apparatus and occupy considerable expensive plant floor space.

The general objects of the present invention are the provision of an improved tube drawing machine having advantages over the prior art apparatus described above, the provision of a tube drawing machine that occupies considerably less floor space than prior art apparatus capable of performing the same reduction in diameter, the provision of a drawing machine capable of high speed drawing of long continuous lengths of tubing, the provision of such a machine that compares favorably to the fastest prior machines in the overall time required to set up, draw and remove the long length of tubing despite the small floor space occupied, and the provision of a machine that is reliable and accurate in drawing and is capable of producing high quality accurately drawn tubing.

More specific objects of the invention include the provision of a drawing machine and method according to which the strand is drawn in consecutive passes between two reels mounted on the apparatus, the strand being unwound from one reel and rewound on the other and then reversed in direction to be unwound from the second reel and rewound on the first reel, and so on, being reduced during each pass; the provision of such apparatus and method in which the strand is unwound from each reel in level-wind relation and is wound on each reel in level-wind relation, the provision of means for automatically threading up the reel to which the strand is passing; the provision of apparatus of this type having a capstan between the two reels, which capstan alternately draws a strand from each reel and feeds it to the other reel, and rotates in opposite directions on alternate passes; the provision of such apparatus embodying means for causing the strand to wind on the capstan in level-wind relation for a required number of traction turns; the provision of such apparatus in which the capstan is provided with means for gripping the end of the strand and for automatically releasing it at the conclusion of the winding of a predetermined number of traction turns on the capstan, while the gripping means is located in the position in which the released end of the strand can be threaded onto the reel on which the strand is to be wound.

Further objects and advantages of the invention will become apparent from the following description of a preferred form thereof, reference being made to the accompanying drawings. The essential characteristics of the invention are summarized in the claims.

In the drawings:

FIGURE 1 is a front elevation, to a reduced scale, of the apparatus as used for drawing tubing, shown in broken lines, the parts being shown in their positions at the beginning of the actual drawing operation;

FIGURE 2 is a plan of FIGURE 1, to the same scale;

FIGURE 3 is an enlarged section along line 3—3 of FIGURE 2 of the capstan and its driving means, the capstan being shown as positioned so that its tube-gripping means is in the position at which it initially grips the tubing to wind it on the capstan, rather than as in FIGURE 1;

FIGURE 4 is a front elevation, to an enlarged scale of a portion of the capstan located as in FIGURE 3, showing the tube-gripping means and associated tube kick-out means, parts being broken away along line 4—4 of FIGURE 5;

FIGURE 5 is a sectional elevation along line 5—5 of FIGURE 4 and to the same scale;

FIGURE 6 is a section along line 6—6 of FIGURE 1 but to a larger scale, showing one of the reel-supporting mandrels, its driving means, a reel mounted on the mandrel in threading position, and means in the reel for gripping the end of tubing wound on the reel;

FIGURE 7 is a section along line 7—7 of FIGURE 1, showing to a larger scale and in more detail the tube-gripping means on the reel, the reel facing oppositely from FIGURE 6;

FIGURE 8 is a section along line 8—8 of FIGURE 7;

FIGURE 9 is a section along line 9—9 of FIGURE 7;

FIGURE 10 is a front elevation of the upper central portion of the apparatus of FIGURE 1 showing, to a larger scale, the left-hand draw head and the right-hand threading head ni the positions they occupy when tubing is passing from the left-hand reel to the right-hand reel, the capstan and the tubing being shown in broken lines;

FIGURE 11 is a plan from line 11—11 of FIGURE 1, to a larger scale, of the reciprocable carriage that carries the right-hand draw head and threading head;

FIGURE 12 is a section, along line 12—12 of FIGURE 10, but to a larger scale, of a shear, forming part of each draw head, for severing the tail end of tubing from a pay-off reel;

FIGURE 13 is a section along line 13—13 of FIGURE 10 of the shear driving means;

FIGURE 14 is an elevation of conveyor means and elevator for loading and unloading the reel for the left-hand coil in FIGURE 1, similar means being provided for loading and unloading the right-hand reel of FIGURE 1;

Figure 21:
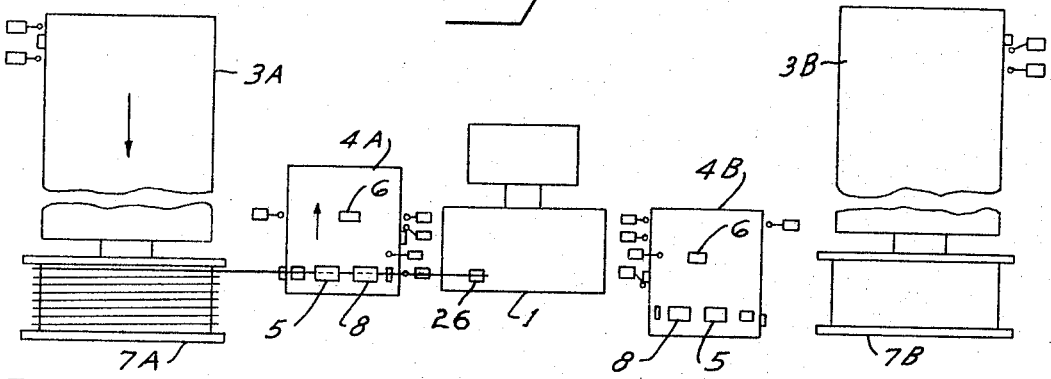
Figure 22:
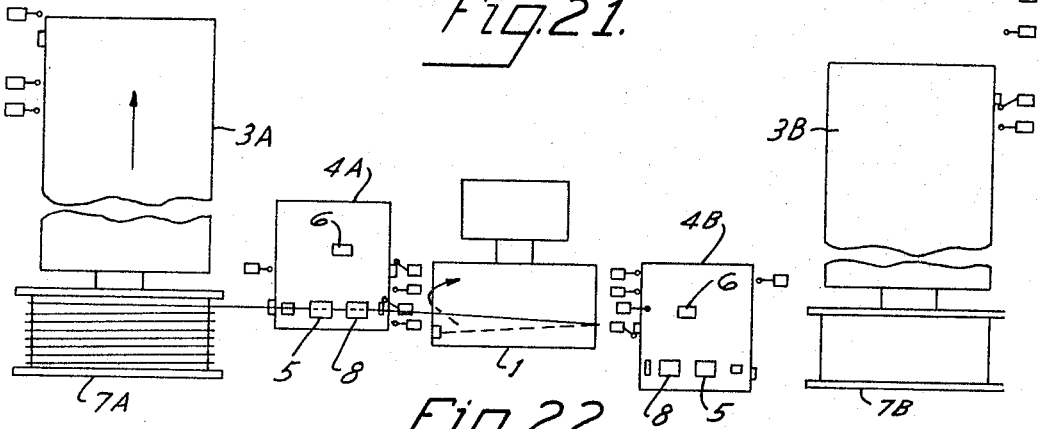
Figure 23:
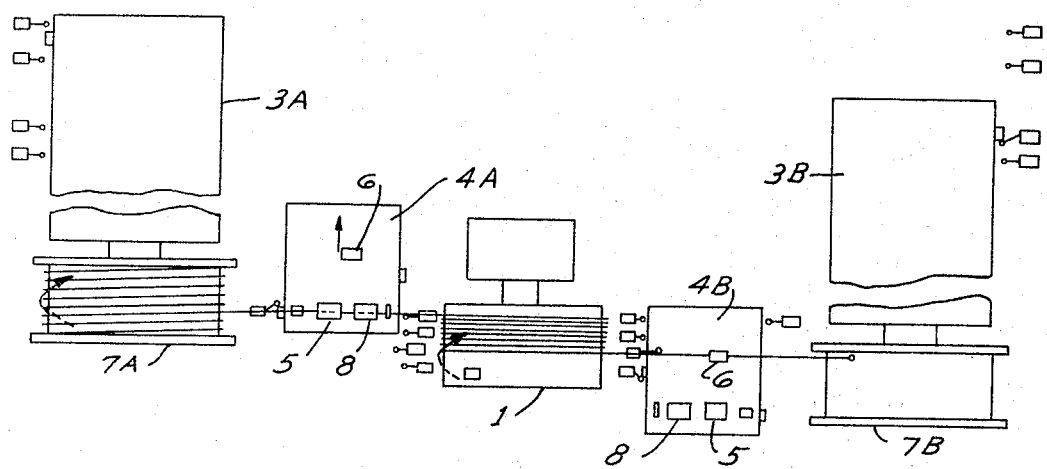
Figure 24:
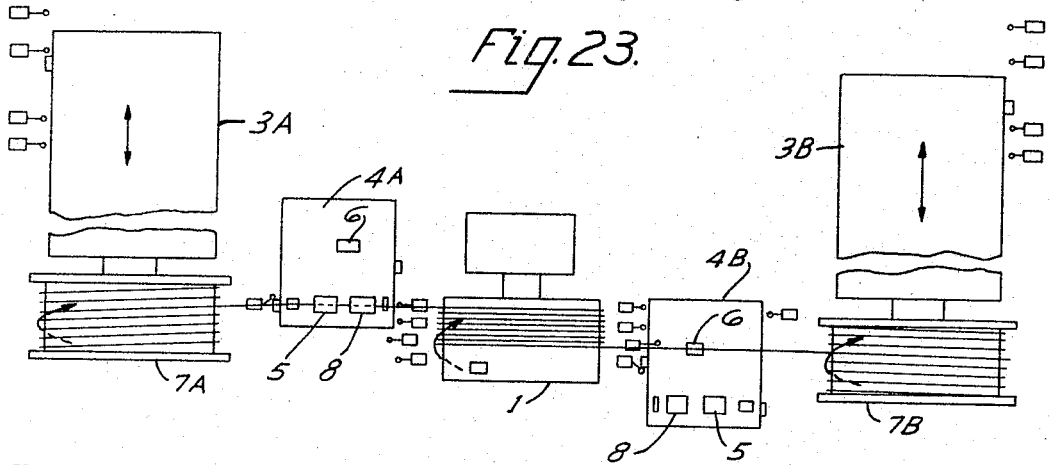
Figure 25:
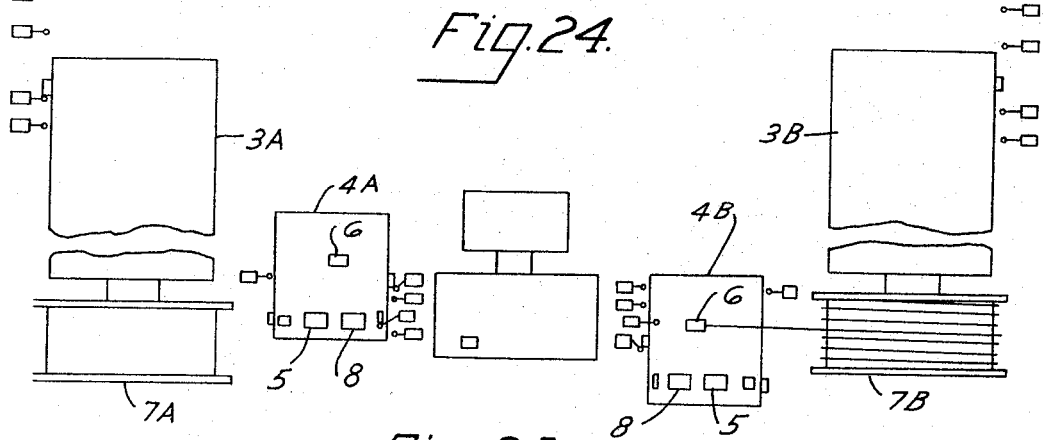
Figure 26:
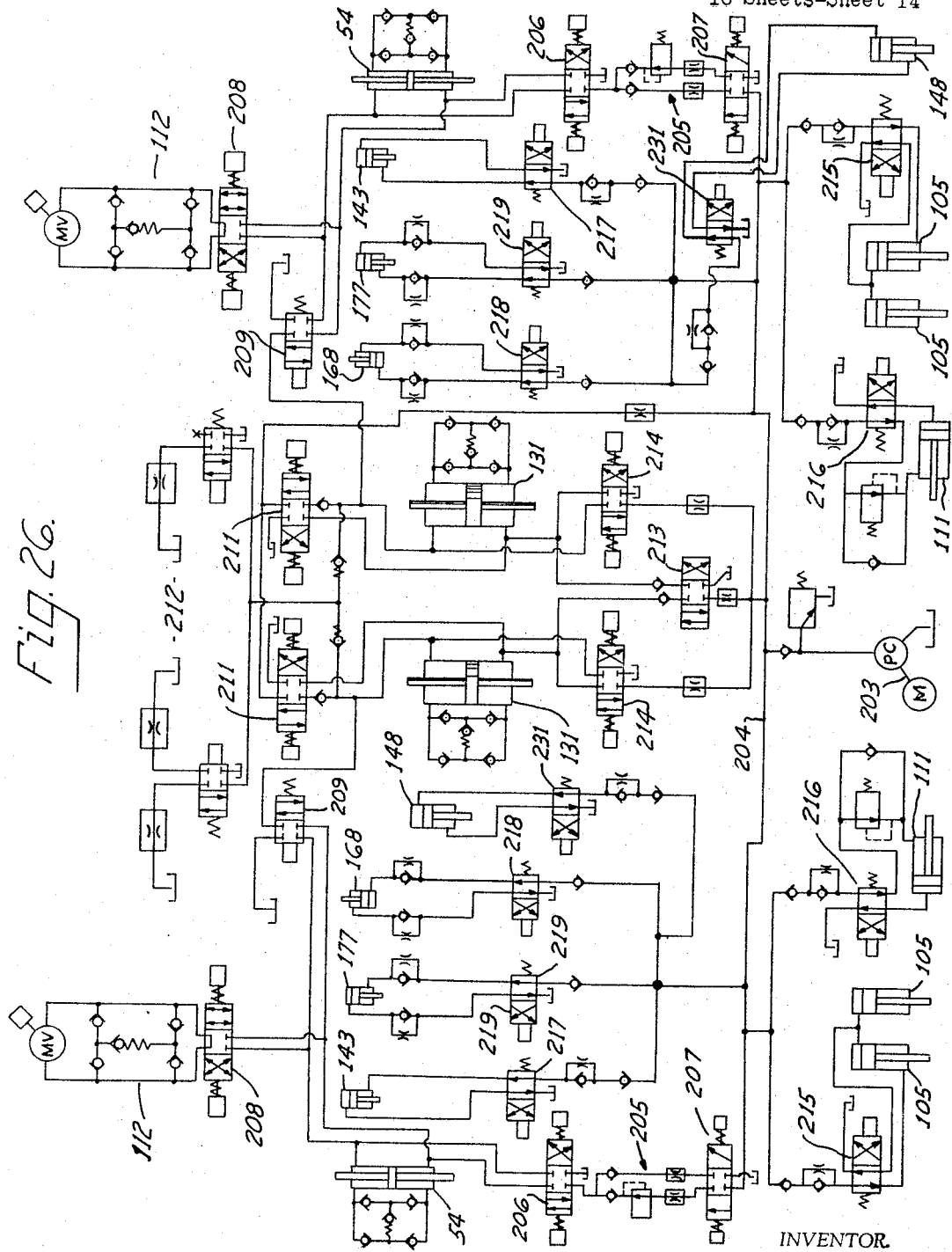

FIGURE 21 diagrammatically illustrates the beginning of the threading up operation;

FIGURE 22 illustrates another step in the threading up of the capstan;

FIGURE 23 illustrates completion of the threading of the capstan, the leading end of the tubing being received by the empty right-hand reel;

FIGURE 24 illustrates the drawing operation;

FIGURE 25 illustrates the completion of the drawing operation;

FIGURE 26 diagrammatically illustrates the hydraulic fluid-powered portion of the automatic control system;

FIGURE 27 schematically shows the pressurized air-powered portion of the automatic control system; and FIGURE 28 diagrammatically illustrates an electrical portion of the automatic control system.

General arrangement

The illustrated apparatus comprises a power-driven capstan 1 rotatable about a horizontal axis at automatically controlled speeds and cycles of starting and stopping; two identical reel-supporting mandrels 2A and 2B on opposite sides of the capstan 1, the mandrels being respectively mounted on lower carriages 3A and 3B for rotation about horizontal axes parallel to the capstan and for reciprocation longitudinally of the mandrel axes in automatically controlled cycles; upper carriages 4A and 4B reciprocable in paths parallel to the axes of the mandrels and capstan, each of these carriages carrying a draw head 5 and a threading head 6 and being located between one of the reel mandrels and the capstan; and reels 7A and 7B demountably supported by and locked on mandrels 2A and 2B.

In the apparatus as shown in FIGURE 1, the reel 7A mounted on the left-hand mandrel 2A carries a coiled single length of several hundred feet of tubing T that is to be reduced to a smaller size; the reel 7B mounted on the right-hand mandrel 2B is in all respects identical to reel 7A except that it is empty at the beginning of the operation. The previously pointed leading end of the tubing T on the reel 7A is manually threaded through a die 8 on the left-hand draw head 5, and is gripped on the capstan 1 by suitable means to be described. The capstan is then initially rotated at threading speed to wind a predetermined number of traction turns on the capstan, after which it releases the leading end of the tubing in a proper position for entry into the right-hand reel threading head 6. The turns of tubing on the capstan are held on the capstan as the lead end of the tubing is automatically guided through the right-hand reel threading head 6 and gripped on the right-hand reel 7B by means to be described. The capstan 1 and the reels 7A and 7B are then automatically accelerated to rotate to a drawing speed and unwinding and rewinding speeds in clockwise direction, while the tubing passes from left-hand pay-off reel 7A, through the die 8 on the left-hand draw head 5, around the capstan 1 and to the right-hand takeup reel 7B, being thus reduced. The mandrels 2A and 2B are reciprocated longitudinally during this drawing process on carriages 3A and 3B to permit the tubing to be drawn off the left-hand reel 7A in level unwinding relation and wound in level wound multiple layers on the right-hand reel 7B. When the tubing tail portion, constituting the tube point of a previous draw, is reached, the tubing is automatically cut off from the payoff reel 7A.

After the resulting cut tail end is drawn through the apparatus, it is manually pointed and dimpled, and the reverse procedure is followed. The new pointed tubing end is manually threaded through the right-hand draw head 5 and die 8 to the capstan 1 on which it is gripped; the capstan is then rotated in the opposite direction at threading speed to wind the required predetermined traction turns on the capstan, after which it releases the tubing end for entry into the left-hand reel threading head 6. This threads the tubing end into the left-hand reel 7A, which grips the end, and the capstan and the reels 7A and 7B are then automatically accelerated to rotate at drawing, unwinding and rewinding speeds in counterclockwise direction. Both reels are reciprocated by their mandrels to permit proper level unwinding and rewinding of the tubing.

The tubing is thus successively drawn through consecutive passes alternately from left to right and from right to left to reduce the tubing to its finished size, the dies 8 being manually changed as required to effect the desired reduction in each pass. The reel wound with the finish size tubing is then removed by means later described. A new reel wound with tubing requiring reduction may then be fixed on the appropriate mandrel 2A or 2B and the cycle repeated.

Capstan and associated mechanism

FIGURES 1, 2, 3, 4 and 5 illustrate the structure of capstan 1 and the means for rotably supporting and positively rotating it in a fixed location. A base 10 rigidly carries a housing 11 in which is journaled a shaft 12 having a tapered outboard end on which the capstan 1 is rigidly fixed by key 13 and plate 14 bolted to the shaft end. Shaft 12 is rotated by a gear 15, a pinion 16 meshing with gear 15 and fixed to a shaft 17 that is journaled in housing 11 and coupled to shaft 18 of an adjustable speed reversible electric motor 19 fixed to base 10. The uncoupled end of motor shaft 18 is adapted to be braked as required by a conventional electrically actuated magnetic brake 21 mounted on base 10 adjacent such end of the motor shaft; this also brakes the capstan 1.

Capstan 1 comprises a hub 22 by which it is mounted on shaft 12, a rear wall 23 fixed to hub 22 and to a cylindrical outer wall 24, radially extending spoke members 25 (FIGURES 1 and 4) fixed to the hub 22 and to the inside of outer wall 24 to support and strengthen it.

Capstan 1 also includes means 26 for gripping the leading end of tubing T while it is wound on the capstan for a predetermined number of traction turns, and for then releasing this tubing end. The illustrated gripping means comprises two generally radially extending lever members 27 and 28 (FIGURES 4 and 5) pivotally supported from hub 22 for movement parallel to the capstan axis. The upper ends of these lever members project through outer wall 24 of the capstan; members 29 fixed in the outer wall guide the upper ends of members 27 and 28 against movement transversely of the axis of the capstan.

The lever members 27 and 28 are moved toward each other to tube-clamping position and moved away from each other to release position by a fluid actuated cylinder 31 pivoted at its inner end on hub 22 with its piston rod 32 pivotally connected to one end of a bifurcated actuating member 33. The other end of member 33 extends on each side of member 28 and is pivotally connected to blocks 34 slidably mounted between the edges of members 29 that guide the blocks for movement in only a radial path. Actuating member 33 is also pivotally connected to lever member 28, while like member 35 is pivotally connected in slotted lever member 27 at an identical location thereon, and to blocks 34 about the same axis as member 33. The outer projecting ends of lever members 27 and 28 each tiltably carries a gripping jaw 36 the confronting faces of which are concavely curved to clamp firmly the leading end of a tube when lever members 27 and 28 are in clamping position. Springs 37 on the capstan hold the jaws 36 when they are not used. When piston rod 32 of cylinder 31 is extended the above described linkage urges the gripping jaws 36 together as shown in broken lines; when rod 32 is retracted the linkage moves jaws to their release position, shown in full lines. Fluid for actuating cylinder 31 in either direction is supplied by conduits 38 and 39 that extend through the hollow capstan shaft 12.

The capstan 1 also includes, spaced from each side of the gripping means transversely of the axis of the capstan, a kick-out means 41 adapted to be normally held in retracted position as shown in full lines in FIGURE 4 and to be extended to kick-out position as shown in broken lines. Each means 41 comprises a plate 42 extending transversely through the outer wall 24 of the capstan at a location, and for a plate width, such that the plate 42 can contact turns of tubing released by the gripper 26. Plate 42 is fast to a rod 43 slidably mounted in the capstan and extendible by a fluid-operated cylinder 44. Compression spring 45 around rod 43 biases the plate 42 to its retracted position. Each kick-out member 41 is operable to force the leading end of the tubing away from the capstan after it has been released by the gripper 26 after the traction turns of tubing have been wound on the capstan, as will be described later. The fluid conduits 46 for both cylinders 44 connect to a conduit 47 extending rearwardly through hollow shaft 12.

Associated with capstan 1 is a pair of elongated rubber-surfaced snubber rolls 48 (FIGURES 1 and 2) at each side of the upper portion of capstan 1 and near the drawing and threading heads. Each roll 48 is long enough to extend over the width of the capstan that carries tubing turns, and is freely rotatably mounted upon an axis parallel to the capstan, on an arm 49 pivotally mounted on the housing 11. Both arms 49 are pivotally connected to the ends of a piston rod 50 projecting from a double-ended fluid-actuated cylinder 51 mounted on housing 11. By proper control of fluid to cylinder 51 the rolls 48 can be drawn toward the capstan to hold the turns of tubing T on the capstan during the winding and unwinding of the traction turns on the capstan; the rolls 48 preferably are retracted at all other times.

A safety shield 52, having an inner surface forming part of a cylinder, is mounted on base 10 of the apparatus below the capstan.

*Reels and associated mechanism*

The means for supporting and actuating the reels 7A and 7B are identical except for the changes arising from the left-hand and right-hand drive arrangements apparent from FIGURES 1 and 2. Consequently the construction and arrangement of this means for both reels will be apparent from the following description of the reel 7B and its associated structure, taken in conjunction with FIGURES 1, 2, 6, 7, 8 and 9.

Base member 10B which with its counterpart 10A forms part of base member 10, rigidly carries spaced lower tracks 53 that extend essentially parallel to each other and to the rotational axis of capstan 1. These tracks reciprocably carry reel carriage 3B that can be moved forwardly and rearwardly by a fluid-actuated cylinder 54 having projecting from each end a piston rod 55 the ends of which are connected to carriage 3B. A housing 56 fixed to the carriage rotatably supports a reel shaft 57 that demountably carries the reel 2B. Shaft 57 is rotated by adjustable-speed reversible electric motor 58 mounted on carriage 3B, through motor shaft 59 coupled to countershaft 61 that drives reel shaft 57 through speed-reducing gears in housing 56. A conventional electrically operated magnetic brake 62 is mounted on the carriage behind the motor to brake rotation of the motor shaft 59 and the reel as required.

The reel 7B is demountably fixed on mandrel 2B (FIGURES 1, 6 and 7) that is fast to shaft 57. This mandrel comprises a suitably apertured outer wall 63 of generally frusto-conical outer configuration that is supported from a hub 64 by radial spokes 65. Mandrel 2B also includes three locking mechanisms 66 and a fluid-actuated cylinder 67 (FIGURES 1, 6 and 7) having a piston rod 68 that actuates tube-gripper 69 on the reel, as later described.

The demountable reel 7B comprises, as shown in FIGURES 1, 2, 6 and 7, spaced front and rear flange walls 71 and 72 separated by a cylindrical tube-supporting outer wall 73, and an inner wall 74 having a generally frustoconical interior surface matching the frustoconical exterior surface of outer wall 63 of the mandrel 2B. The reel 7B carries several pairs of closely spaced rearwardly axially projecting fingers 75 adapted to receive radially extending lugs 76 fixed to the rear of mandrel 2B, to insure that the reel will be positively driven and halted by the mandrel.

Each reel locking mechanism 66 of the mandrel comprises a fluid-operated cylinder 77 rigidly fixed inside the mandrel so its piston rod 78 extends inwardly and can bear against a lug 79 rigidly fixed to a rod 80 having latch 81 fixed to one end. Rod 80 is radially slidably mounted in bracket 82 on mandrel 2B and its latch is slidably mounted in outer wall 63 of the mandrel. A compression spring 83 surrounding rod 80 between latch 81 and bracket 82 biases the latch so it normally projects outwardly beyond the frustoconical surfaced outer wall of the mounting hub and engages the rear edge of a keeper slot 84 in the frustoconical surfaced inner wall of the reel to lock the reel against movement parallel to the reel axis. Preferably, the engaging surfaces of latches 81 and slots 84 are inclined to provide wedging effects when the latches are forced outwardly by springs 83 and to facilitate withdrawal of the latches when they are moved inwardly by cylinders 77.

The gripper 69 for gripping the leading end of the tubing T comprises (FIGURES 1, 2, 6–9) spaced tubular inlet portions 85 extending inwardly from the tube supporting outer wall 73 of the reel along a chord of an arc of this wall adjacent rear reel flange 72; the cross section of the opening 86 through each portion 85 will accommodate the largest tube to be handled. Between the confronting inner ends (FIGURES 1, 7 and 8) of these portions 85 are disposed fixed and movable gripping jaws 87 and 88 adapted to grip the end of tubing T being wound on the reel; movable jaw 88 is shown in gripping position in FIGURE 8, the tube end being shown in broken lines. The movable jaw 88 is rigidly fixed to one end of a pair of spaced parallel bars 89 which at the other end are rigidly connected by a cross member 91. Bars 89 are slidably mounted and guided in a structure comprising spaced outer plate 92 and inner plate 93. At one end these plates carry a cross member 94 extending between bars 89; at the other end they are fixed to fixed jaw 87; they are also fixed to side members 95 (FIGURES 7, 8 and 9). The structure including plates 92 and 93 thus support bars 89 so that movable jaw 88 is accurately guided for movement toward and away from fixed jaw 87. This structure is mounted by bracket 96 bolted to the reel.

Inner plate 93 pivotally carries a lever 97 having a first bearing portion 98 extending between bars 89 and bearing behind movable jaw 88 and a second bearing portion 99 spaced from the first and located to be contacted by the piston rod 68 of cylinder 67 on the mandrel 2B. Consequently, when piston rod 68 is extended by admission of pressurized fluid to the cylinder 67 through conduit 100, lever 97 forces the movable jaw 88 to grip firmly against fixed jaw 87 the free end of the tube T that extends into tubular inlet portions 85. When pressurized fluid is admitted through the other fluid conduit 101, the cylinder positively retracts piston rod 68, so lever 97 can exert no force on the movable jaw 88, permitting it to be retracted by compression spring 102 between cross member 91 and bolts 103 extending between members 89 through plates 92 and 93. Conduits 100 and 101, as well as the conduit supply fluid to conduits 104 for locking mechanism cylinders 77, pass through reel shaft 57 which is hollow for the purpose.

The portion of the apparatus associated with each reel 7A and 7B also includes two fluid-actuated cylinders 105 having piston rods that, when extended, push the reel off the mandrel after the reel-locking mechanisms 66 have been released; these cylinders are mounted on housings 56.

Associated with each reel mandrel 2A and 2B is a snubber roll means 106 (FIGURES 1 and 2) that engages and holds the turns of tubing T on the reel at the beginning and end of winding of tubing on the reel, and is retracted at all other times. Each means 106 is mounted at the side of its mandrel adjacent the capstan 1, and comprises an elongated rubber-surfaced roll 107 adapted to extend for substantially the full width of the reel between its flanges, and two pairs of narrow rubber-surfaced rolls 108 and 109 mounted adjacent the ends of roll 107 so that they are as close as possible to the reel flanges when the rolls are engaged with the tubing, thus permitting the full width of the outer tubing coil on the reel to be contacted by the rolls. Rolls 107, 108 and 109 are freely rotatably mounted on a bracket-arm structure 110 pivotally supported from the lower carriage 3A or 3B that reciprocably supports the reel mandrel. Each arm 110 is connected to the piston rod of a carriage-mounted fluid-actuated cylinder 111 that can be controlled to move the snubber rolls into engagement with tubing T on the reel as shown in broken lines in FIGURE 1 and to move the rolls to their retracted position as shown in full lines.

A metering type fluid pump 112 (FIGURES 2 and 6) is mounted on each inner carriage 3A and 3B and connected to the rear of motor shaft 59. Pump 112 is connected through fluid conduits 113 and 114 to cylinder 54 that activates the lower carriage. The pump is a conventional type and is adjustable and so arranged and controlled by conventional means that when the reel 7A or 7B with which it is associated rotates for one revolution the reel is advanced or retracted by its carriage as required by a distance equivalent to one tube diameter.

Upper reciprocable carriages

Each of the upper reciprocable carriages 4A and 4B (as shown in FIGURES 1, 2, 10–13) supports one of the draw heads 5, one of the threading heads 6, and a plow 115 adjacent the capstan. Both threading heads are identical except for changes caused by the fact that the draw heads, threading heads and plows face in opposite directions on opposite sides of the capstan, so only one carriage or part associated with a carriage will be described.

As shown in FIGURES 1, 2, 10 and 11, the main base member 10 rigidly supports a superstructure 116 comprising front and rear cross members 117 and 118. These carry pairs of horizontal parallel U-cross section tracks 119 extending parallel to the axes of rotation of the capstan and reel mandrels.

The carriage 4B is reciprocably supported by tracks 119 at the upper right of the capstan in FIGURE 1. This carriage comprises longitudinal frame members 121, front cross members 122 and 123, intermediate cross members 124 and 125, and rear cross member 126. At its corners the carriage has rollers 127 rotatable about horizontal axes, that travel in the tracks 119, and rollers 128 rotatable about vertical axes and adapted to engage the inner edges of tracks 119; the carriage thus is guided vertically and transversely in its travel. The carriage 4B is adapted to be moved forwardly and rearwardly along the tracks by piston rod 129 of a fluid-actuated cylinder 131 mounted on the superstructure 116 (FIGURES 2 and 11).

Each of the draw heads 5 shown in FIGURES 1 and 10 (the latter of which shows the left-hand draw head in drawing position) is tiltably supported from downwardly extending portions 132 and 133 of carriage cross members 122 and 123. The draw head comprises a central upright portion 134 carrying trunnions 135 fitting into portions 132 and 133, a transverse portion 136 facing the capstan, and another transverse portion 137 extending away from the capstan. Portion 136 has a quick-change manually removable die box 138 carrying a manually interchangeable draw die 8 and guide die 8' that can be conventionally secured by locking mechanism actuated by handle 139. Portion 137 pivotally supports upper member 141 carrying a grooved roller 142 that can be moved toward and away from tubing T by fluid-operated cylinder 143 mounted on portion 134; portion 137 also has fixed to it a lower member 144 carrying grooved rollers 145 and 146. Draw head 5, pivotally supported by trunnions 135, is biased downwardly by spring 147, but can be urged upwardly by fluid-operated cylinder 148 initially to position the draw head properly for the drawing operation. Cylinder 148 is disengaged from the draw head 5 after the leading end of the tubing is gripped and in drawing position, so the draw head can be tilted by spring 147 when the tubing is severed either by cutting or by breakage. As explained later, such tilting effects operation of the apparatus.

The upper roller 142 therefore can be raised while tubing T is manually threaded over the lower rollers and through portion 134, die box 138, guide die 8' and die 8 to the capstan gripper 26; roller 142 then is lowered so it and rollers 145 and 146 can guide and straighten the tubing as it passes to and through the dies to capstan 1. A screw 149 threaded through member 144 and bearing against member 141 adjusts the gap between the upper and lower rollers for various tubing sizes.

As apparent from FIGURES 12 and 13, each draw head also includes means for severing the tail end of the tubing from the pay-off reel. Two circular cross sectioned members 151 are journaled in portion 134 for rotation about upright axes through substantial arcs. These members carry shear blades 152 adapted to move in cutting relation as shown in FIGURE 12 as the members 151 rotate in their arcs. As shown in FIGURE 13, members 151 are actuated by their gear teeth 153 that engage the teeth 154 on both sides of a rack 155; the rack is movable along its axis in either direction by pistons 156 that are located in cylinders 157 oppositely disposed on portion 134 and in communication with a source of pressurized fluid through tubes 158.

It is apparent that each draw head 5 is capable of limited movement as a whole about the axis of trunnions 135; this permits tubing passing from the reel to the capstan to adjust itself properly to reduce the tubing without distortion or damage.

As is shown in FIGURES 1, 2, 10 and 11, the downwardly depending portion 133 of the inner cross member 123 forming part of the draw head support of each carriage also supports a plow 115 below the draw head. This plow extends close to the outer surface of the capstan for a substantial arc; as is apparent from FIGURES 1, 2 and 11, it is adjustably tilted slightly from its bottom to its top edge toward the front, and is so located relative to the first turn of tube wound on the capstan after it leaves the draw head that the plow pushes the turns of tube on the capstan toward the outer edge of the capstan, thus making room for succeeding turns to be wound on the capstan during the drawing operation, and causing the tubing continuously to wind on and unwind from the capstan in a level manner.

As is apparent from FIGURES 1, 2, 10, 17–19, each upper reciprocable carriage 4A and 4B also carries a threading head 6. Each threading head comprises a stationary guide member 159 rigidly supported from downwardly depending portions 161 of the carriage intermediate cross members 124 and 125; this stationary guide member defines an upwardly facing straight groove 162 of which the entering end nearest the capstan and of which the discharge end are so located that the end of tubing supported in the groove and passing tangentially in a straight line from the capstan will enter the tubular inlet portions 85 of the reel toward which the tube is traveling when such reel is properly angularly and longitudinally located as shown in FIGURES 1, 2, 17 and 18.

A mating movable guide member 163, having a downwardly facing groove 164, is pivotally connected to the ends of spaced parallel links 165 the other ends of which are pivotally supported by depending portions 161 of the upper carriage. One link 165 is rigidly connected to an arm 166 connected to piston rod 167 of fluid-operated cylinder 168 (FIGURES 10 and 11) that is pivotally connected to and extends transversely of the upper carriage. Consequently, as shown in full lines in FIGURE 10, movable guide member 163 fits with the stationary guide member 159 so their grooves define an elongated opening of closed circumference properly located to guide the tubing to the reel on which it is to be wound.

The movable guide member 163 may be retracted to the position shown in broken lines in FIGURE 10, in which it is normally maintained except when the leading end of the tubing is being guided from the capstan to the reel associated with the threading head.

Each threading head 6 also includes an auxiliary guide 169 (FIGURES 10, 17–19) hingedly mounted at its upper end from the carriage, and at its lower end connected to a link 171 pivotally connected to one of the links 165 of the movable guide member. When movable guide member 163 is in its guiding position shown in full lines in FIGURE 10, auxiliary guide 169 is extended as in full lines and aids in guiding the leading end of the tubing after it has been released from the capstan into the opening between stationary and movable guide members 159 and 163, the groove 164 of movable member 163 being inclined upwardly as shown to be close to the outlet of guide 169.

Figure 17:
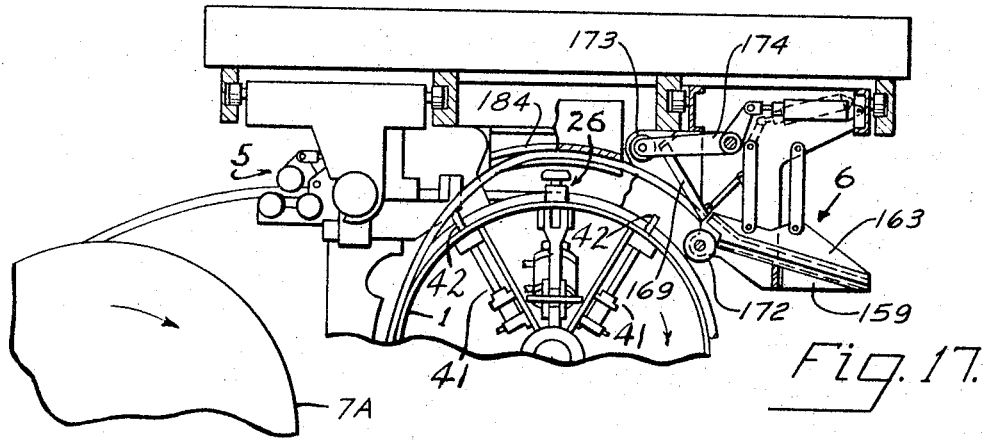
FIGURE 17 is a view, corresponding generally to FIGURE 10 but having the draw head indicated diagrammatically, showing the position of the capstan and the positions of the capstan tube gripper and kick-out mechanisms as they release the end of the tubing wound on the capstan at the end of the winding of the traction turns.
Figure 19:
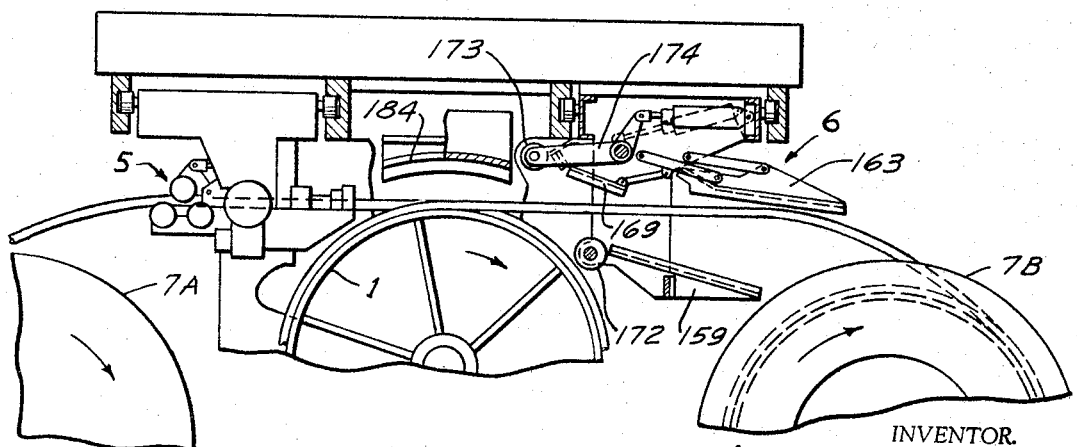
FIGURE 19 is a similar view showing the position of the parts after the threading means has been retracted, also showing the tubing as it passes from the payoff reel, around the capstan, and to the takeup reel.

Each threading head also includes a lower grooved roller 172 rotatable about an axis fixed to the upper carriage, and an upper grooved roller 173 rotatably carried by arm 174 pivoted on the carriage and moved by arm 175 connected to piston rod 176 of a fluid-actuated cylinder 177 on the carriage, so that upper roller 173 can be retracted as in FIGURES 10, 17 and 19. These rollers guide and straighten the tube as it passes to the takeup reel in the threading operation, until it is engaged by the reel gripper 69.

FIGURES 1 and 11 illustrate means for adjusting the position of upper roller 173 for different sizes of tubing, comprising an arm 178 intermediately pivotally mounted on the upper carriage and projecting forwardly beyond the front of the carriage; the rear end of arm 178 provides a stop 179 that limits travel of piston rod 176 of upper roller-actuating cylinder 177; arm 178 is adjusted by hand screw 181 threaded into the front of the carriage and bearing against the front end of arm 178, being locked by nut 182. Tension spring 183 biases adjusting arm against screw 181.

Superstructure 116 also carries an upper guide 184 (FIGURES 1, 2, 3, 10, 17–19) located centrally above the capstan and having downwardly projecting segmental ribs 185 and 186 defining an arcuate channel parallel to the curved capstan surface, into which the freed end of the tubing extends after release by the capstan. Rib 185 is transversely as well as radially curved (FIGURES 1 and 2) to guide the released ends of the tubing to the threading heads.

As shown in FIGURE 1, the superstructure 116 also carries above each reel mandrel a pointing and dimpling head 187 of conventional construction into which the lead end of the tubing can be manually led and which points and dimples it before it is threaded through the draw head, around the capstan, and to the other reel.

*Reel-handling equipment*

Figure 15:
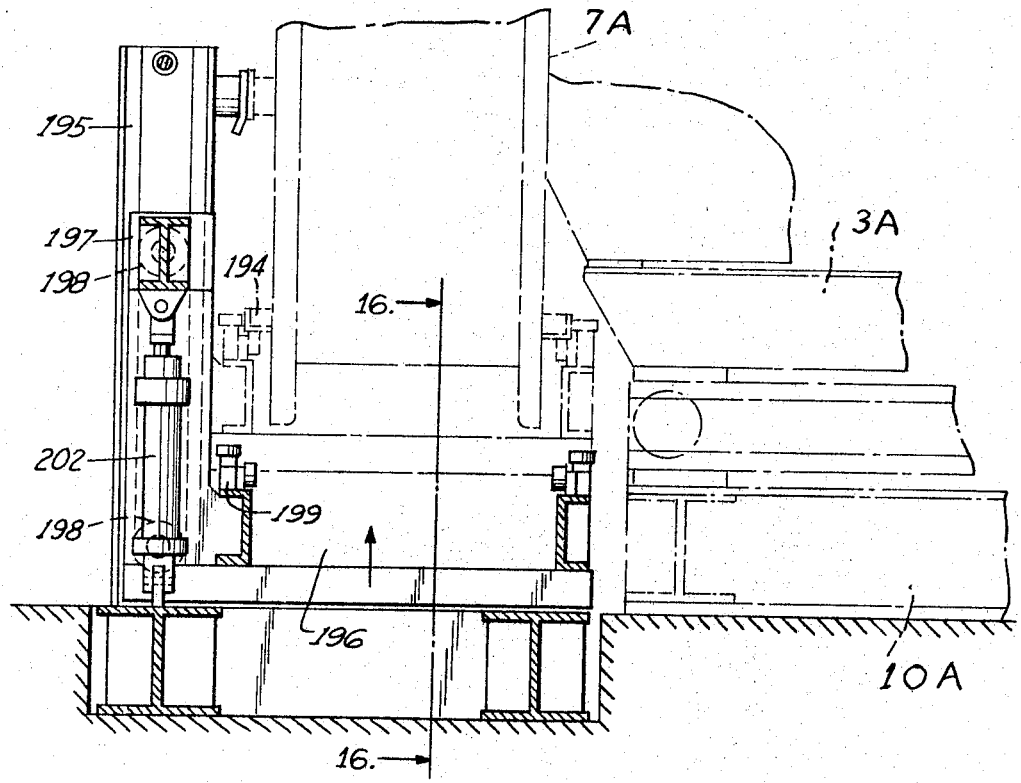
FIGURE 15 is a section along line 15—15 of FIGURE 14.
Figure 16:
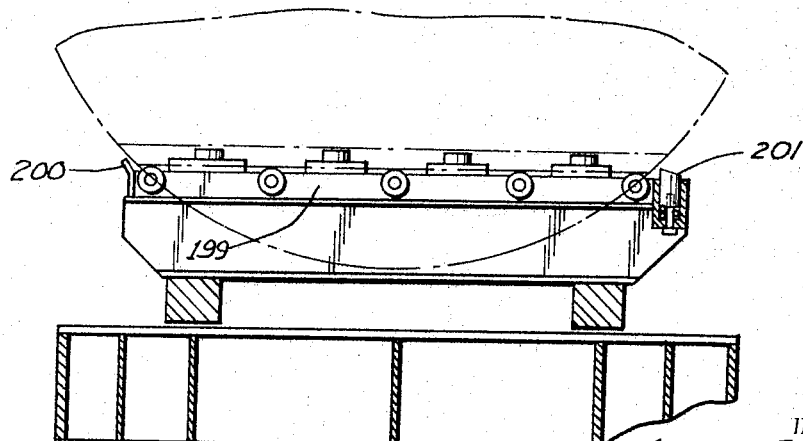
FIGURE 16 is a section along lines 16—16 of FIGURE 15.

The reel-handling equipment illustrated in FIGURES 14, 15 and 16 delivers empty reels to the apparatus for mounting on the appropriate reel mandrel and also unloads reels wound with the drawn tubing from either mandrel and removes them from the apparatus. The reel-handling equipment associated with each reel mandrel comprises a transfer conveyor 188 and a loader 189.

The transfer conveyor 188 comprises siderails 191 each carrying a row of horizontally mounted rollers 192 and a row of vertically mounted rollers 193 located to support and guide the lugs 194 fixed to the flanges of the reels. The reels are shown as manually movable along the rollers on the transfer conveyor.

The reel loader 189 comprises two spaced vertical guideways 195 rigidly mounted at the front of the loader, and carrying a lift 196. Lift 196 comprises two upright members 197 carrying rollers 198 that engage the guideways so that members 197 cannot tilt, and a section 199 of transfer conveyor that is rigidly cantilevered on the upright members 197 of the lift. The parts are designed so that when lift 196 is in its lowermost position portion 199 of the lift is aligned with transfer conveyor 188, so that a reel can be rolled on or off the lift, and when the lift is in its upper position, the reel is coaxial with the retracted reel mandrel. FIGURE 16 shows that, to locate the reel, the lift includes a fixed stop 200 on its end adjacent the capstan and a movable upwardly biased stop 201 at its other end that can be overridden when the reel is pushed on and off the lift. The lift is raised and lowered by a fluid-actuated cylinder 202.

It is obvious that a reel can be moved manually from the transfer conveyor onto the lift, then raised to a position where it can be engaged by the mandrel, after which the lift can be lowered. In reverse order, the lift can be raised to engage and support a reel on a mandrel, after which the mandrel can be retracted to release the reel, which can be lowered so it can be moved onto the transfer conveyor.

*Operation and control*

The operation of the apparatus can be understood by reference to the preceding figures and by particular reference to FIGURES 17, 18, 19 and 20–25, inclusive, the last of which diagrammatically show the positions of the reels, capstan and upper carriages and various phases of an operation of one pass of drawing tubing from a reel at the left to a reel at the right.

Figure 20:
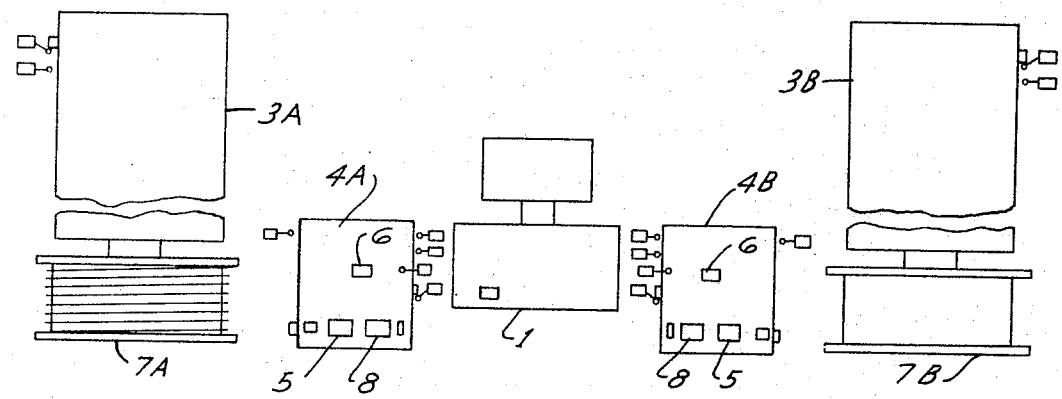
FIGURE 20 is a diagrammatic plan view of the apparatus, both reels being shown in the non-drawing reset position at the beginning of a drawing cycle.

FIGURE 20 diagrammatically shows in plan the positions of the parts in the non-drawing reset position in which a payoff reel 7A wound with tubing to be drawn is mounted on the left-hand mandrel 2A, whereas a reel 7B, identical except that it is empty, is mounted on the right-hand mandrel 2B. These reels have been moved to their respective mandrels and loaded by the reel handling equipment as previously described.

The leading end of the tubing T on reel 7A is pointed and dimpled, if required, by unit 187. Left-hand reel 7A and left-hand upper carriage 4A are then controlled so that reel 7A moves forward and the carriage retracts to the positions shown in FIGURE 21. The tubing leading end is then manually passed through the left-hand draw head 5, upper roller 142 being retracted to facilitate this, the point being passed through the guide die 8′ and draw die 8 to the capstan gripper 26. Roller 142 is then brought down onto the tubing to aid in guiding and straightening it. From FIGURE 21 it is apparent that the tubing then extends in a plane normal to the axis of reel 7A to the capstan gripper 26.

The operator then starts the apparatus. The gripper cylinder 31 causes the capstan gripper to grip the leading end of the tubing, and the capstan rotates for approximately one turn while the reel 7A and upper carriage 4A rapidly retract for a distance of approximately seven inches, so these parts are then in the relationship shown in FIGURE 22. The capstan then rotates at threading speed of about 100 to 200 feet per minute until a predetermined number of traction turns, eight in this case, have been wound on the capstan while left-hand carriage 4A retracts at a slower rate to level-wind the turns on the capstan while the reel 7A retracts relatively to both the capstan and carriage 4A to cause the tubing to unwind in a level manner from reel 7A. The capstan snubber rolls 48 meanwhile are actuated to contact and hold in place the tubing turns being wound on the capstan. The parts are then as indicated in FIGURE 23.

Figure 18:
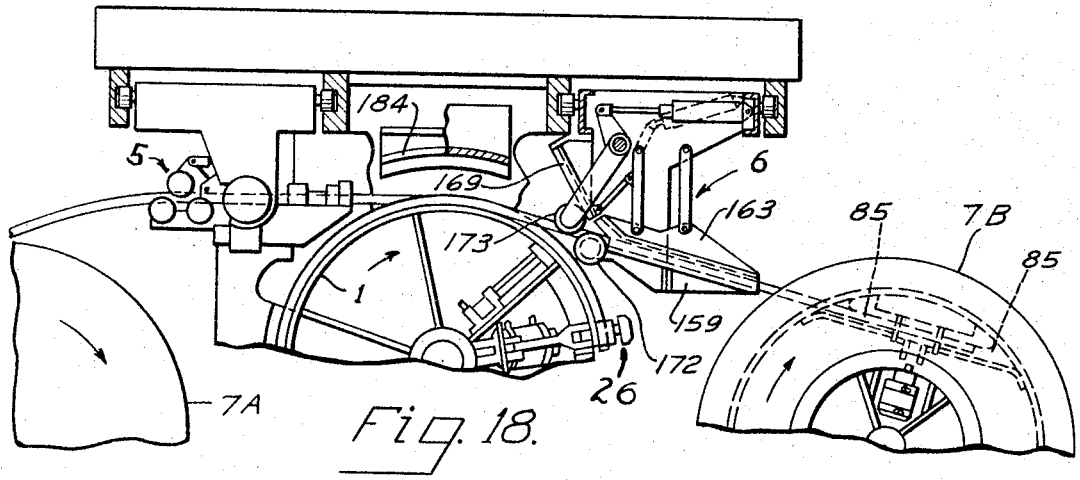
FIGURE 18 is a similar view showing the position of the parts when the end of the tubing is guided by the threading means into the gripping means on the reel on which the tubing is to be wound.

After the predetermined number of traction turns of tubing have been wound on the capstan, capstan gripper 26 is released as it approaches its uppermost position, and is fully released when it is upright, as is shown in FIGURE 17; at the same time the kick-out mechnisms 41 are actuated to begin projecting their plates 42, which are fully projected when the capstan gripper is in its uppermost position; in the illustrative circumstances only the left-hand kick-out mechanism contacts the tubing, acting to lift the tubing out of the capstan gripper and urge it upwardly so its leading end contacts and is guided by the upper guide 184 to right-hand threading head 6, which has been previously moved into its threading position. As shown in FIGURES 17 and 18, the upper movable guide member 163 and auxiliary guide member 169 also have been moved into their extended or threading positions, and the upper roller 173 is retracted.

The leading end of the tubing T is propelled by continued rotation of the capstan, by the action of the engaged snubber rolls 48, and by the stiffness of the tubing, through the guide means 184 which conducts it to auxiliary guide 169, and thence to the opening defined by the closed guide members 159 and 163. The upper roller 173 is then moved down to bear against the tubing to straighten it, so that as the capstan 1 continues rotation the leading end of the tubing passes through the opening defined by the grooves of guide members 159 and 163 of right-hand threading head 6 into the properly positioned tubular inlet portions 85 in the right-hand reel 7B where the tubing end is automatically gripped by reel gripper 69 upon actuation of cylinder 67 of mandrel 2B, as previously described. The parts are then positioned as in FIGURES 18 and 23.

The upper roller 173, the movable guide member 163, and the auxiliary guide 169 are then retracted out of contact with the tubing, as shown in FIGURE 19, while the reel snubber roll means 106 is actuated to hold the first turns of tubing on the reel.

The reel 7B is then rotated at threading speed of 100–200 feet per minute; after two or three turns are thus wound, the snubber roll means 106 is retracted, and the system is accelerated to a drawing speed in the range of from 1200 to 4800 feet per minute, depending on the diameter of the tubing; the parts are then in the relationship shown diagrammatically in FIGURE 24. The upper carriages 4A and 4B are maintained stationary in the positions shown in FIGURE 23, while the lower carriages 3A and 3B reciprocate the reels 7A and 7B at the proper speed and strokes to cause tubing to unwind in level relation from the left-hand reel and wind in level relation on the right-hand reel. During this operation, the left-hand plow 115 continuously contacts the first turn of tubing wound on the capstan and continuously pushes the tubing toward the free end of the capstan so that the turns lie adjacent each other in level relation in a single layer rather than piling up on the capstan. The reels are driven to maintain a controlled tension in the tubing fed to the left-hand draw head 5 and in the tubing delivered from the capstan and wound on the reel 7B. The tubing assumes the path shown in FIGURES 1 and 19 during this operation, being reduced as it passes through the die 8 held in the diebox 138.

When the tail end portion of the tubing wound on the left-hand reel 7A is reached, the tube speed is reduced to threading speed, and the rack 155 and members 151 of the left-hand draw head are automatically operated by appropriate cylinder 157 to move the shear blades 152 so they bite into the moving tubing T and are pulled through the remainders of their arcs by the tubing as the blades cut off the tubing. The blades are then returned to their starting clearance positions by the other cylinder 157. As soon as the tubing is severed, the left-hand draw head 5 tilts as described above, thus causing, through means to be indicated, the reel snubber means 106 to move inwardly until its rolls contact the tubing wound on the right-hand reel, the capstan snubber rolls 48 to move inwardly until they contact the tubing on the capstan, and the carriage 4A to start to move the left-hand plow 115 toward the front of the capstan. The tubing wound in the turns on the capstan then is unwound from the capstan as the capstan rotates at threading speed, being held on the capstan by the capstan snubber rolls 48 and being moved by left-hand plow 115 axially toward the front of the capstan to proper unwinding position, until the cut tail end of the tubing leaves the capstan and passes onto the reel 7B, after which the apparatus stops. The parts are then as diagrammatically shown in FIGURE 25.

The new leading end of the tubing on the right-hand reel, which was formerly the tail end, is then pointed by right-hand pointing means 187, and led through a smaller die 8 in the right-hand diebox 138, and the process is repeated with the reels and capstan rotating in the opposite direction.

The tubing is repeatedly drawn in each direction, the die through which the tubing passes on each pass being manually changed to provide the desired reduction for the pass, until the tubing reaches the desired small size. The reel with the final diameter tubing is then unloaded as described previously. The same mandrel may be reloaded with a filled reel of tubing to be drawn, or the empty reel may be removed from the other mandrel and replaced with a reel wound with tubing to be reduced.

The automatic means for effecting the above described automatic operations will be apparent from FIGURES 2, 3, FIGURES 20–25, and FIGURES 26, 27 and 28. Of the last three figures, FIGURE 26 schematically shows a hydraulic power system for actuating the cylinders 54 that reciprocate the lower carriages 3A and 3B that support the reels, the cylinders 131 that reciprocate the carriages 4A and 4B that carry the draw heads and threading heads, the cylinders 105 that push the reels off the mandrels when required, the cylinders 143 that actuate the upper straightening rolls 142 of the draw heads, the cylinders 148 that straighten the draw heads 5 initially in drawing positions, the cylinders 168 that actuate the movable threading guide members 163, and the cylinders 172 that actuate the straightening rolls 173 of the threading heads.

FIGURE 27 diagrammatically illustrates a pneumatic power system for actuating the capstan gripper cylinder 31, the capstan kick-out means cylinders 44, and the capstan snubber cylinder 51, as well as the reel locking mechanism cylinders 66, the reel gripper cylinders 67, and the shear actuating cylinders 157 on the draw heads.

FIGURE 28 schematically shows electrical means for controlling the fluid power systems of the preceding diagrams, in this case, however, the electrical lines being shown as single lines for simplicity, rather than double lines.

In the system of FIGURE 26, hydraulic fluid under a suitable pressure is supplied from source 203 to a supply line 204. This line supplies fluid to each of the assemblies 205 that controls the direction and rate of traverse provided by cylinder 54 that reciprocates one of the lower carriages. Each valve assembly 205 comprises suitable solenoid valves 206 and 207 and other conventional hydraulic mechanisms to effect the desired result. As was indicated above, the amount of reciprocatory movement for each rotation of the reel to achieve level-winding and unwinding is controlled by a metering type fluid pump 112 connected to the appropriate one of the motor shafts 59. This pump 112, which is adjustable for different tube diameters, is controlled by a solenoid valve 208.

Each valve 208 also is adapted to communicate with one of the solenoid valves 209 that, when actuated, communicates with one of the solenoid valves 211 forming part of a system 212 for controlling fluid bleed-off, and hence traverse rates of the cylinders 131 that reciprocate the upper carriages 4A and 4B. The fluid powering these cylinders 131 comes from main supply line 204 through solenoid valve 213 and left and right-hand solenoid valves 214 that determine which of these carriages is reciprocating and the direction and length of stroke of its reciprocation.

The remaining cylinders 105, 111, 143, 148, 168 and 177 energized by the system of FIGURE 26 are respectively actuated by solenoid valves 215, 216, 217, 231, 218 and 219 supplied from the hydraulic main 204.

In the pneumatic system outlined in FIGURE 27, air under suitable pressure is supplied from a source 221 constituting a supply line, to mains 222. As is apparent, the capstan gripper cylinder 31 is supplied with pressurized air from main 222 through solenoid valve 223 and adjustable pressure regulator 224. The capstan kick-out cylinders 44 are actuated by air controlled solenoid valve 225 and capstan snubber roll cylinder 51 by air controlled by solenoid valve 226 through adjustable pressure regulator 227 from main 222. The locking mechanism cylinders 66 for each reel are actuated through a solenoid valve 228 that controls air from supply line 222. Each reel gripper cylinder 67 is controlled by its own solenoid valve 229. The shear cylinders 157 on each draw head are actuated by air from main 222 controlled by a separate solenoid valve 232.

The various solenoid valves are actuated at the proper times by an electrical system, of which a portion is diagrammatically shown in FIGURE 28 and other portions are shown in FIGURES 2, 3 and 20–25. The electrical system comprises four electrical switches 234 (FIGURE 3) each actuated by an appropriate cam 235 on capstan shaft 12, a 10-circuit conventional rotating control switch 236 driven from capstan shaft 12 by belt 237 (FIGURE 2), conventional 8-circuit rotating control switches 238 driven by belts 239 from reel drive shafts 57, limit switches 241, 242, 243 and 244 actuated when lower carriages 3A and 3B move, and limit switches 245, 246, 247, 248 and 249 actuated by movements of upper carriages 4A and 4B. These switches are connected by leads 251 and 252 to control switches 236 and 238, and through known means control the operation of the solenoid switches and other parts of the apparatus.

The electrical system also includes an electrical switch 253 (FIGURES 10 and 11) on each upper reciprocable carriage 4A and 4B. Each switch is adapted to be actuated by its associated draw head 5 when the draw head is tilted so that its portion 144 moves downwardly due to the pull of spring 147. As was indicated previously, such tilting occurs when the tubing T passing through the draw head is severed, as by cutting off the tail portion of the tubing from the payoff reel, or in the event of breakage of the tubing. In either event, when the switch 253 is thus actuated, by suitable conventional electrical means the various solenoid valves indicated above are controlled to cause the hydraulic and pneumatic power systems to cause the apparatus to operate as has been described above after the tail end of the tubing has been cut off the payoff reel. The particular parts affected are dependent, of course, on whether the tubing is passing from the left-hand reel to the capstan or from the right-hand reel to the capstan when the tubing is severed; but in either case the operations are identical except as changed by the direction of travel of the tubing and the corresponding parts affected.

No further extended description of the automatic control system is necessary since it is within the ordinary skill of the art to provide such control means in view of the above disclosure.

*Summary*

The invention thus provides a machine and method whereby strands, and particularly tubes, can be drawn repetitively between two reels, over a rotating capstan that draws a strand from one reel and feeds it to the other reel. After a strand has been completely drawn in one direction, the capstan is rotated in the reverse direction to draw the strand from the reel on which it has been wound to feed it to the other reel, the drawing being carried out in repetitive passes in opposite directions. The machine is a high speed automatically controlled apparatus that provides drawn material of high quality.

On each reel from which the strand is unwound, the strand is coiled in one or more layers, preferably a relatively large number of layers, each layer of which is level in that the turns of strand in the layer are sequentially adjacently disposed and do not overlap any other turns in the layer. The strand is level-unwound from such reel so that the strand leaving each strand turn is in a plane substantially normal to the axis of rotation of the reel and the turns do not overlap during unwinding.

The strand is level-wound on each reel on which the strand is wound up, so that the strand as it approaches the reel travels in a plane substantially normal to the axis of the reel and the strand is wound in one or more level layers in each layer of which the strand turns are sequentially adjacently disposed and do not overlap any other turns in the layer.

The strand is also disposed in a single level layer on the capstan and is level-wound on and level-unwound from the capstan.

Those skilled in the art will appreciate that various changes and modifications can be made in the machine and apparatus described herein by way of example, all without departing from the spirit or scope of the invention. The essential characteristics of the invention are defined in the appended claims.

I claim:

1. Apparatus for drawing a strand comprising a rotatable capstan; two rotatable mandrels, each adapted to support a reel, located at angular positions adjacent the capstan for rotation each about its own axis; means for reciprocating each of said mandrels along its axis of rotation; means for positively rotating each of said mandrels; means for positively rotating said capstan; and drawing die means between each of said mandrels and said capstan, each of which die means is alternately used to draw a strand passing from one of the reels to the capstan through said die means.

2. Apparatus for drawing a strand comprising a rotatable capstan; two rotatable mandrels, each adapted to support a reel, located at spaced angular positions adjacent the capstan for rotation about axes substantially parallel to the axis of rotation of the capstan; means for positively rotating each of said mandrels; means for positively rotating said capstan; drawing die means between one of said mandrels and said capstan, said die means being used to draw a strand passing from one of the reels on said mandrels to the capstan through said die means; and means for moving said die means in a path substantially parallel to the axis of said capstan.

3. Apparatus for drawing a strand comprising a rotatable capstan; two rotatable mandrels, each adapted to support a reel, located at spaced angular positions adjacent the capstan for rotation about axes substantially parallel to the axis of rotation of the capstan; means for reciprocating each of said mandrels along its axis of rotation; means for positively rotating each of said mandrels; means for positively rotating said capstan; drawing die means between each of said mandrels and said capstan, each of which die means is alternately used to draw a strand passing from one of the reels on said mandrels to the capstan through said die means; and means for moving each of said die means in a path substantially parallel to the axis of said capstan.

4. Apparatus for drawing a strand comprising a rotatable capstan; two rotatable mandrels, each adapted to support a reel, located at spaced angular positions adjacent the capstan for rotation about axes substantially parallel to the axis of rotation of the capstan; means for reciprocating each of said mandrels along its axis of rotation; means for positively rotating each of said mandrels; means for positively rotating said capstan; drawing die means between each of said mandrels and said capstan, said die means being alternately used to draw the strand passing from one of the reels on said mandrels to the capstan through said die means, said die means being mounted for movement along a path substantially parallel to the axis of rotation of said capstan; releasable means on said capstan for gripping the end of the strand passing from either one of said reels through one of said die means to said capstan; and means for positioning said die means so that the strand passing from the reel adjacent said die means to said capstan passes in a plane substantially normal to said gripper means, for moving said die means substantially parallel to the axis of said capstan as it rotates for a predetermined number of turns after said gripper means has been actuated to grip the leading end of said strand, and for thereafter halting said die means.

5. Apparatus for drawing a strand comprising a rotatable capstan; two rotatable mandrels, each adapted to support a reel, located at spaced angular positions adjacent the capstan for rotation about axes substantially parallel to the axis of rotation of the capstan; means for reciprocating each of said mandrels along its axis of rotation; means for positively rotating each of said mandrels; means for positively rotating said capstan; drawing die means between each of said mandrels and said capstan; said die means being alternately used to draw the strand passing from one of the reels to the capstan through said die means, said die means being mounted for movement along a path substantially parallel to the axis of rotation of said capstan; releasable means on said capstan for gripping the end of the strand passing from either of said reels through one of said die means to said capstan; means for positioning said die means so that the strand passing from the reel adjacent said die means to said capstan passes in a plane substantially normal to said gripper means, for moving said die means substantially parallel to the axis of said capstan as it rotates for a predetermined number of turns after said gripper means has been actuated to grip the leading end of said strand and for thereafter halting said die means; and means for moving axially of said capstan turns of strand being wound on said capstan relatively thereto as the capstan rotates and the strand passes from one reel on a mandrel through said die means, around said capstan, and to the other reel.

6. In apparatus for drawing a strand, means for supplying a strand; a rotatable capstan, said capstan having thereon means for temporarily gripping an end of said strand; means for rotating said capstan a predetermined number of turns while said gripping means grips said strand end and then causing said gripping means to release said strand end; a rotatable take-up reel having thereon means for temporarily gripping a strand end; means between said capstan and said take-up reel for causing said strand end released from said capstan gripper to pass to said take-up reel at a location where it can be received by said reel-gripping means; means for positioning said take-up reel so its gripping means can receive said strand end; and means for rotating said reel while its strand end is gripped by said gripping means.

7. The apparatus of claim 6 comprising snubber means to temporarily engage the turns of strand on said capstan after the end of said strand has been released by said capstan gripper means and while said end is traveling to said take-up reel.

8. The apparatus of claim 6 comprising snubber means for temporarily engaging turns of strand material wound on said take-up reel.

9. The apparatus of claim 6 comprising plow means engaging the first turn of strand wound on said capstan to push the turns of strand wound on said capstan axially thereof.

10. In apparatus for drawing a strand, means for supplying a strand; a rotatable capstan, said capstan having thereon means for temporarily gripping an end of said strand; and means for rotating said capstan a predetermined number of turns while said gripping means grips said strand end and for then causing said gripping means to release said strand end.

11. In apparatus for drawing a strand, means for supplying a strand; a rotatable capstan, said capstan having thereon means for temporarily gripping an end of said strand; means for rotating said capstan a predetermined number of turns while said gripping means grips said strand end and for then causing said gripping means to release said strand end; means to which the strand passes from said capstan; and means for causing said strand to level-wind on said capstan and to level-unwind from said capstan after said strand is released by said gripping means.

12. In apparatus for drawing a strand, means for supplying a strand; a rotatable capstan, said capstan having thereon means for temporarily gripping an end of said strand; means for rotating said capstan a predetermined number of turns while said gripping means grips said strand end and for then causing said gripping means to release said strand end; means carried by said capstan and actuatable to move outwardly from said capstan to engage the portion of the strand adjacent the released end thereof to push said strand end away from said capstan.

13. The apparatus of claim 12 comprising snubber roll means mounted adjacent said capstan and adapted to be engaged with turns of strand wound on said capstan.

14. In apparatus of the character described, a reel; supporting means rotatably supporting said reel; and means for reciprocating said reel supporting means in a path parallel to the axis of rotation of said reel, said means being adjustable to permit said reel to move axially thereof during each rotation thereof by a distance essentially equivalent to the diameter of the strand material on said reel.

15. In apparatus of the character described, a reel; supporting means rotatably supporting said reel; means for reciprocating said reel in a path parallel to the axis of rotation of said reel; and means controlled by rotation of the reel for controlling said reciprocating means, said control means being adjustable to permit said reel to move axially thereof during each rotation thereof by a distance essentially equivalent to the diameter of the strand material on said reel.

16. A reel for use in apparatus of the character described having a generally cylindrical strand-supporting surface, strand guide means providing a generally tubular passage opening from said surface inwardly of the reel along a chord of an arc of said strand-supporting surface; and strand-gripping means aligned with said generally tubular passage to grip the end of a strand passing through said tubular passage of said strand guide means to said strand-gripping means.

17. The method of drawing a strand by passing it from a first reel, through a drawing die, to and around a positively rotating capstan and to and on a second reel, the strand being disposed on the first reel in at least one level layer, which method comprises level-unwinding the strand from the first reel, passing the strand in a plane substantially normal to the axis of said first reel through the drawing die to the capstan, level-winding the strand on the capstan in a single level layer while the capstan rotates, level-unwinding the strand from the rotating capstan, passing the strand to the second reel in a plane substantially normal to the axis of the second reel, and level-winding the strand on the second reel.

18. The method of drawing a strand by passing it from a first reel, through a drawing die, to and around a positively rotating capstan and to and on a second reel, the strand being disposed on the first reel in at least one level layer, which method comprises level-unwinding the strand from the first reel while the reel rotates in one direction, passing the strand in a plane substantially normal to the axis of the first reel through the drawing die to the capstan, level-winding the strand on the capstan in a single level layer while the capstan rotates in one direction, level-unwinding the strand from the rotating capstan as it so rotates, passing the strand to the second reel in a plane substantially normal to the axis of the second reel, and level-winding the strand on the second reel as it rotates in one direction; then level-unwinding the strand from said second reel as it rotates in the opposite direction, passing the strand in a plane substantially normal to the axis of the second reel through a drawing die to the capstan, level-winding the strand on the capstan in a single level layer while the capstan rotates in the opposite direction, level-unwinding the strand from the capstan as it so rotates, passing the strand to the first reel in a plane substantially normal to the axis of the first reel, and level-winding the strand on the first reel as it rotates in the opposite direction.

19. In apparatus of the character described a reel; reel-supporting means rotatably supporting said reel; and means for reciprocating said reel-supporting means in a path parallel to the axis of rotation of said reel, said means causing said reel to move axially thereof during each rotation thereof by a distance essentially equivalent to the diameter of the strand material on said reel.

References Cited by the Examiner
UNITED STATES PATENTS

| | | | |
|---|---|---|---|
| 420,165 | 1/1890 | Morse | 205—20 |
| 811,107 | 1/1906 | Thompson | 205—20 |

WILLIAM W. DYER, Jr., *Primary Examiner.*
G. A. DOST, *Assistant Examiner.*